US012579823B2

(12) United States Patent
Ravi Kumar et al.

(10) Patent No.: US 12,579,823 B2
(45) Date of Patent: Mar. 17, 2026

(54) SYNERGIZED 3D OBJECT AND LANE/ROAD DETECTION WITH ASSOCIATION AND TEMPORAL AGGREGATION USING GRAPH NEURAL NETWORKS

(71) Applicant: QUALCOMM Incorporated, San Diego, CA (US)

(72) Inventors: Varun Ravi Kumar, San Diego, CA (US); Senthil Kumar Yogamani, Headford (IE); Heesoo Myeong, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 18/492,617

(22) Filed: Oct. 23, 2023

(65) Prior Publication Data
US 2025/0131742 A1     Apr. 24, 2025

(51) Int. Cl.
| | |
|---|---|
| *G06V 20/56* | (2022.01) |
| *G06V 10/26* | (2022.01) |
| *G06V 10/764* | (2022.01) |
| *G06V 10/82* | (2022.01) |

(52) U.S. Cl.
CPC .......... *G06V 20/588* (2022.01); *G06V 10/267* (2022.01); *G06V 10/764* (2022.01); *G06V 10/82* (2022.01)

(58) Field of Classification Search
CPC .... G06V 20/588; G06V 10/82; G06V 10/267; G06V 10/764
See application file for complete search history.

(56) References Cited

U.S. PATENT DOCUMENTS

| | | | |
|---|---|---|---|
| 12,065,140 B1* | 8/2024 | Pronovost | B60W 40/04 |
| 2021/0042535 A1* | 2/2021 | Abbott | G06T 7/73 |

FOREIGN PATENT DOCUMENTS

| | | | | |
|---|---|---|---|---|
| EP | 4148686 A1 * | 3/2023 | | G06V 20/58 |

OTHER PUBLICATIONS

Zhou et al, "UniDistill: A Universal Cross-Modality Knowledge Distillation Framework for 3D Object Detection in Bird's-Eye View", Jun. 2023, IEEE/CVF Conference on Computer Vision and Pattern Recognition (CVPR), pp. 5116-5125 (Year: 2023).*

* cited by examiner

*Primary Examiner* — David F Dunphy
(74) *Attorney, Agent, or Firm* — Procopio, Cory, Hargreaves & Savitch LLP/QUALCOMM Incorporated

(57) ABSTRACT

Aspects presented herein may improve the accuracy and reliability of object detections performed by multiple object detection models. In one aspect, a UE detects (1) a set of polylines from at least one of a set of bird's eye view (BEV) features or a set of perspective view (PV) features associated with a set of images and (2) a set of three-dimensional (3D) objects in the set of BEV features. The UE associates the set of polylines with the set of 3D objects. The UE updates the set of polylines based on a set of nearby 3D objects or updates the set of 3D objects based on a set of nearby polylines. The UE outputs an indication of the updated set of polylines or the updated set of 3D objects.

26 Claims, 12 Drawing Sheets

$\phi$ = Azimuth angle of departure (A-AoD)
$\theta$ = Zenith angle of departure (Z-AoD)
$\rho$ = Distance
$\phi'$ = Azimuth angle of arrival (A-AoA)
$\theta'$ = Zenith angle of arrival (Z-AoA)

800A
Example of processing outputs of different NN/ML models independently
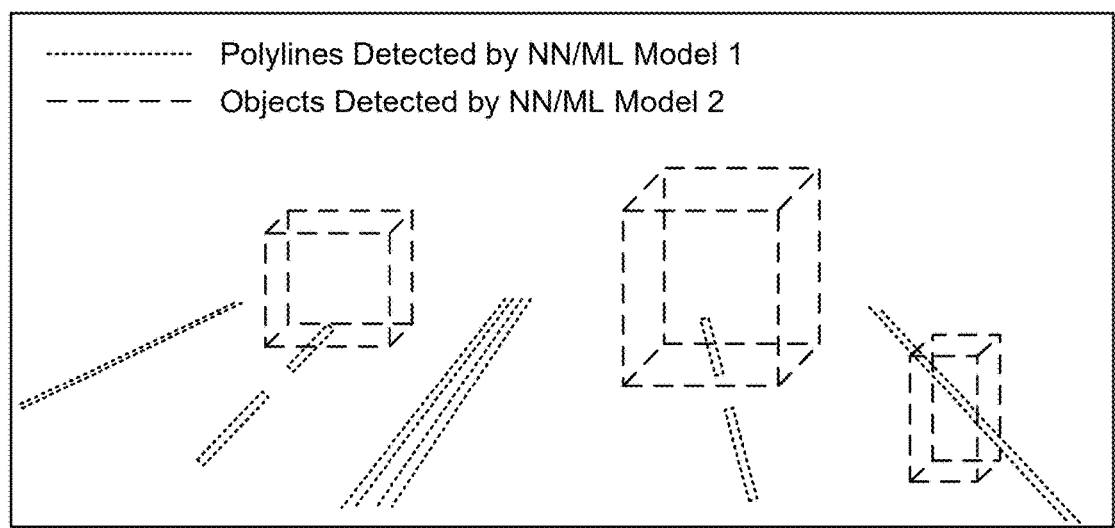
FIG. 8A
800B
Example of processing outputs of different NN/ML models jointly
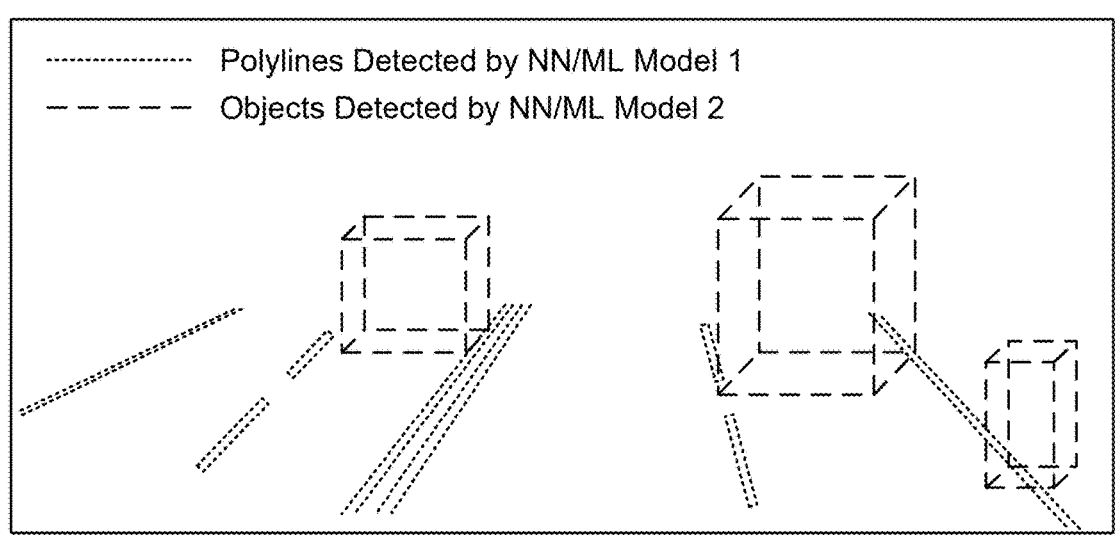
FIG. 8B

1000

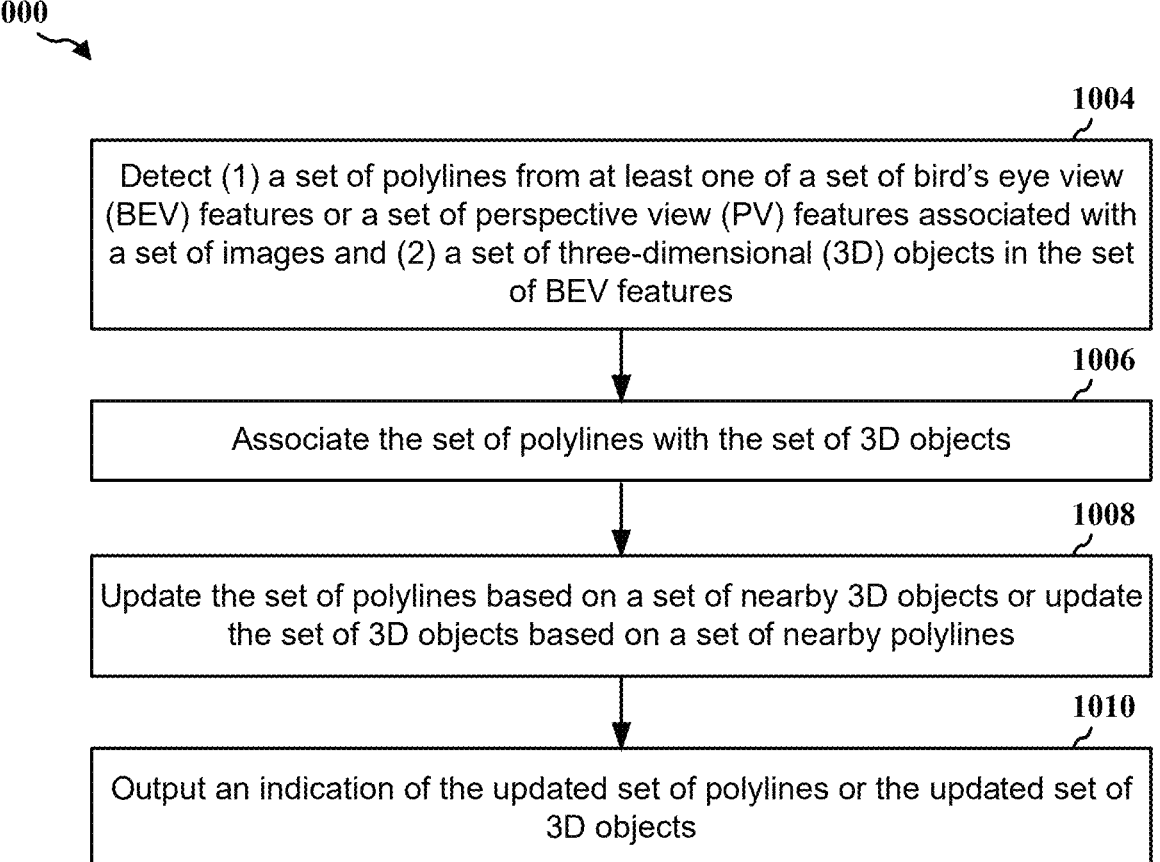

1004

Detect (1) a set of polylines from at least one of a set of bird's eye view (BEV) features or a set of perspective view (PV) features associated with a set of images and (2) a set of three-dimensional (3D) objects in the set of BEV features

1006

Associate the set of polylines with the set of 3D objects

1008

Update the set of polylines based on a set of nearby 3D objects or update the set of 3D objects based on a set of nearby polylines

1010

Output an indication of the updated set of polylines or the updated set of 3D objects

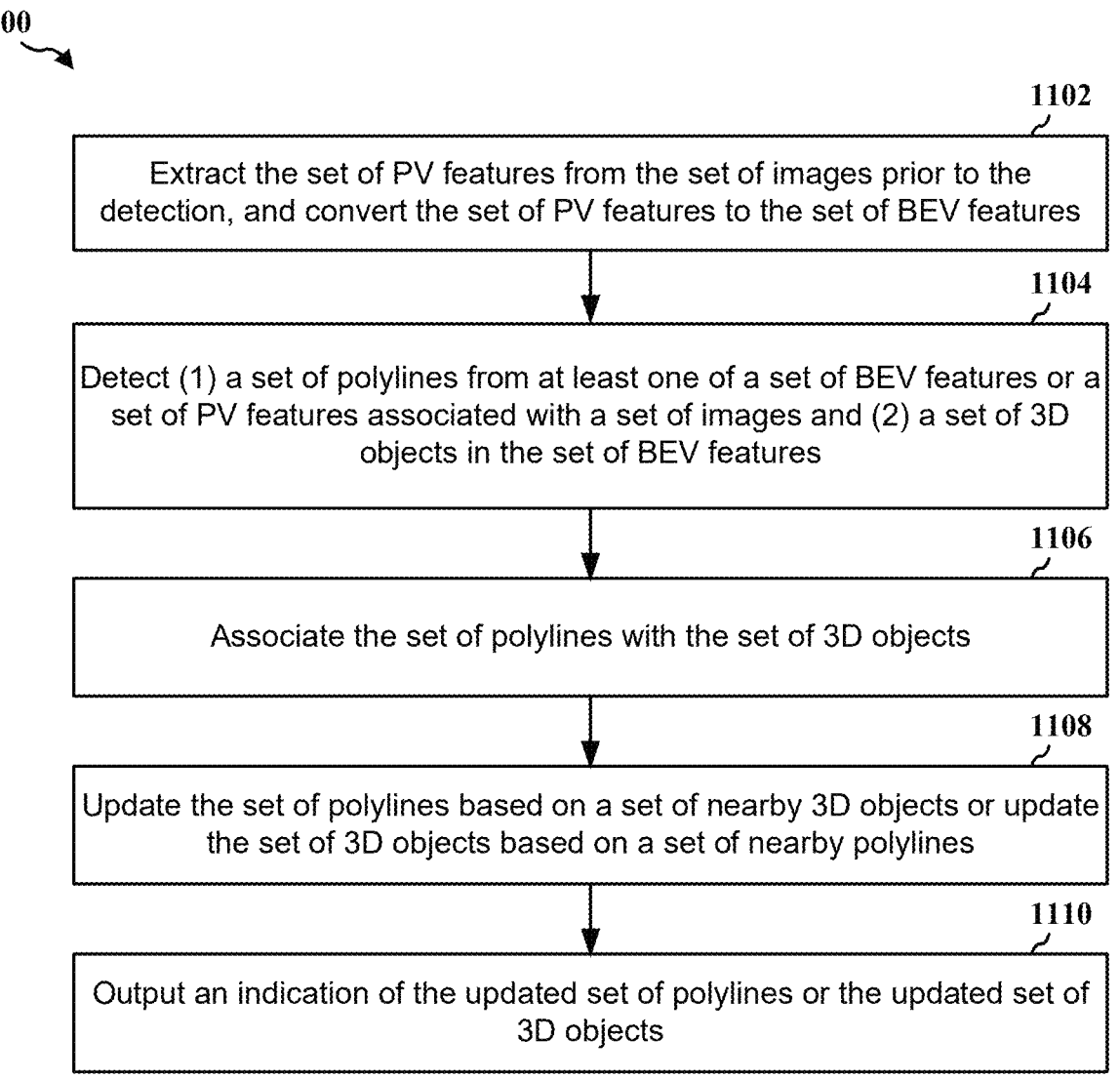

1102

Extract the set of PV features from the set of images prior to the detection, and convert the set of PV features to the set of BEV features

1104

Detect (1) a set of polylines from at least one of a set of BEV features or a set of PV features associated with a set of images and (2) a set of 3D objects in the set of BEV features

1106

Associate the set of polylines with the set of 3D objects

1108

Update the set of polylines based on a set of nearby 3D objects or update the set of 3D objects based on a set of nearby polylines

1110

Output an indication of the updated set of polylines or the updated set of 3D objects

FIG. 11

SYNERGIZED 3D OBJECT AND LANE/ROAD DETECTION WITH ASSOCIATION AND TEMPORAL AGGREGATION USING GRAPH NEURAL NETWORKS

TECHNICAL FIELD

The present disclosure relates generally to communication systems, and more particularly, to image processing involving object detection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus detects (1) a set of polylines from at least one of a set of bird's eye view (BEV) features or a set of perspective view (PV) features associated with a set of images and (2) a set of three-dimensional (3D) objects in the set of BEV features. The apparatus associates the set of polylines with the set of 3D objects. The apparatus updates the set of polylines based on a set of nearby 3D objects or updates the set of 3D objects based on a set of nearby polylines. The apparatus outputs an indication of the updated set of polylines or the updated set of 3D objects.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8A is a diagram illustrating an example of processing outputs of different NN/ML models independently in accordance with various aspects of the present disclosure.

FIG. 8B is a diagram illustrating an example of processing outputs of different NN/ML models jointly in accordance with various aspects of the present disclosure.

FIG. 10 is a flowchart of a method of image processing.

FIG. 11 is a flowchart of a method of image processing.

DETAILED DESCRIPTION

Figure 1:
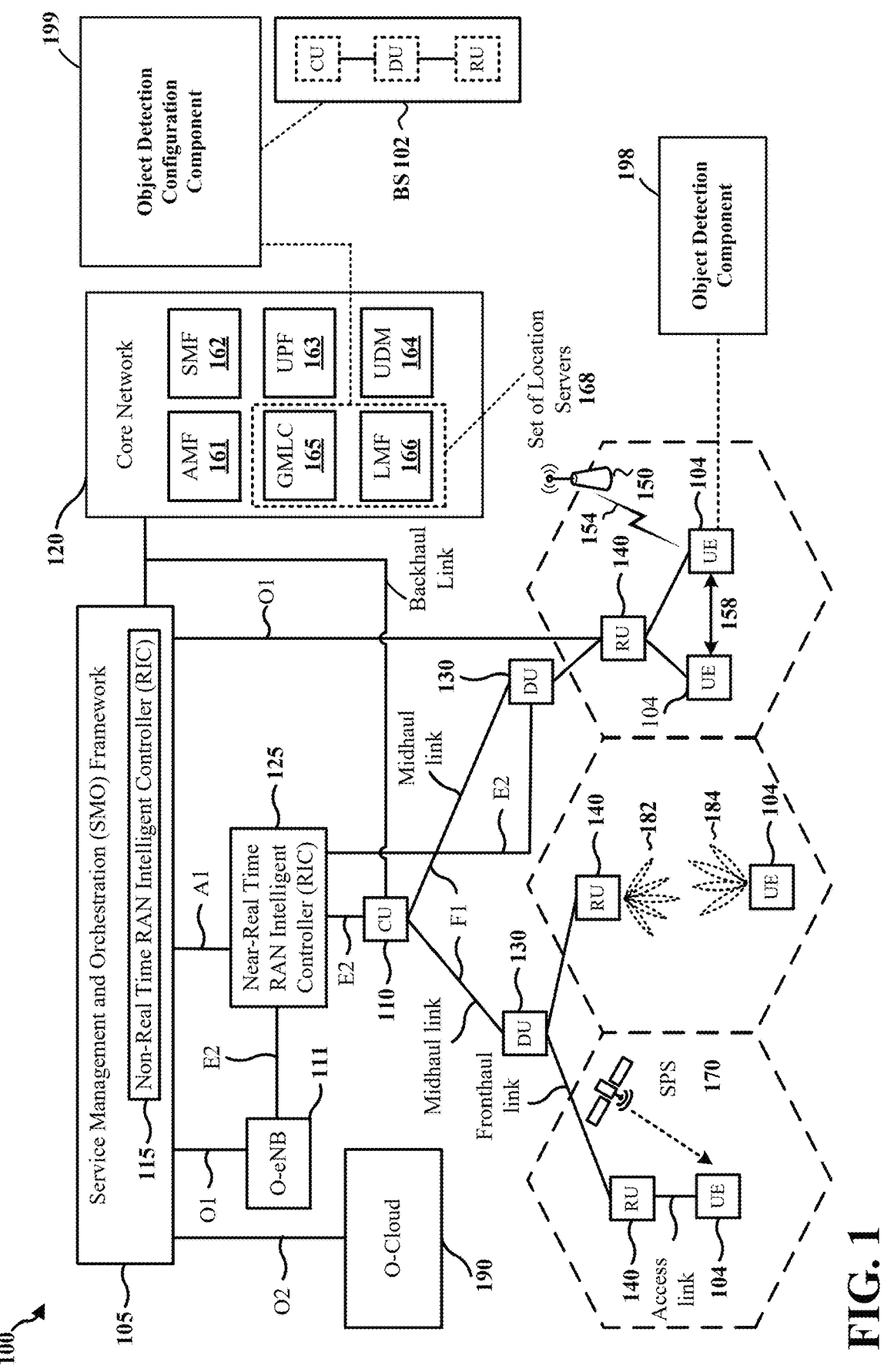
FIG. 1 is a diagram illustrating an example of a wireless communications system and an access network.

Aspects presented herein may improve the accuracy and reliability of object detections performed by multiple object detection models (e.g., neural network (NN)/machine learning (ML) models) by enabling detection tasks performed by different object detection models to be combined (e.g., processed jointly). For example, in one aspect of the present disclosure, a polyline detection model may be configured to be associated with a three-dimensional (3D) object detection model, such that outputs from one detection model may be used to improve and/or adjust outputs of another detection model. For example, the 3D object detection model may use the lane boundary information from the polyline detection model to improve the accuracy of 3D object detection by reducing false positives and improving localization accuracy. Similarly, based on the 3D object detection model's ability to detect positions of 3D objects accurately, the polyline detection model may use the outputs from the 3D object detection model to adjust the lane boundary accordingly.

In typical deep learning (DL) frameworks, polylines and 3D object detection (3DOD) tasks are treated independently. Associating polylines and 3DOD tasks can benefit both tasks by improving their accuracy and robustness (for example, to track an automobile's position and movement inside the lane boundary). Aspects presented herein enable determining polyline and 3DOD output attributes and constructing a unified graph by creating nodes and edges to represent the polylines and 3DOD. A graph neural network (GNN) is used to update the polylines based on the nearby 3DOD. Long-term dependencies between the polylines and 3DOD are captured over time. By integrating information from the polylines and 3DOD, automobile's position and movement inside the lane boundary can be accurately determined.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.)

may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (0-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DIJUL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet muting, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an object detection component 198 that may be configured to detect (1) a set of polylines from at least one of a set of BEV features or a set of PV features associated with a set of images and (2) a set of 3D objects in the set of BEV features; associate the set of polylines with the set of 3D objects; update the set of polylines based on a set of nearby 3D objects or update the set of 3D objects based on a set of nearby polylines; and output an indication of the updated set of polylines or the updated set of 3D objects. In certain aspects, the base station 102 or the one or more location servers 168 may have an object detection configuration component 199 that may be configured to provide configurations and/or parameters related to object detection for the UE 104.

Figures 2A, 2B, 2C, 2D:
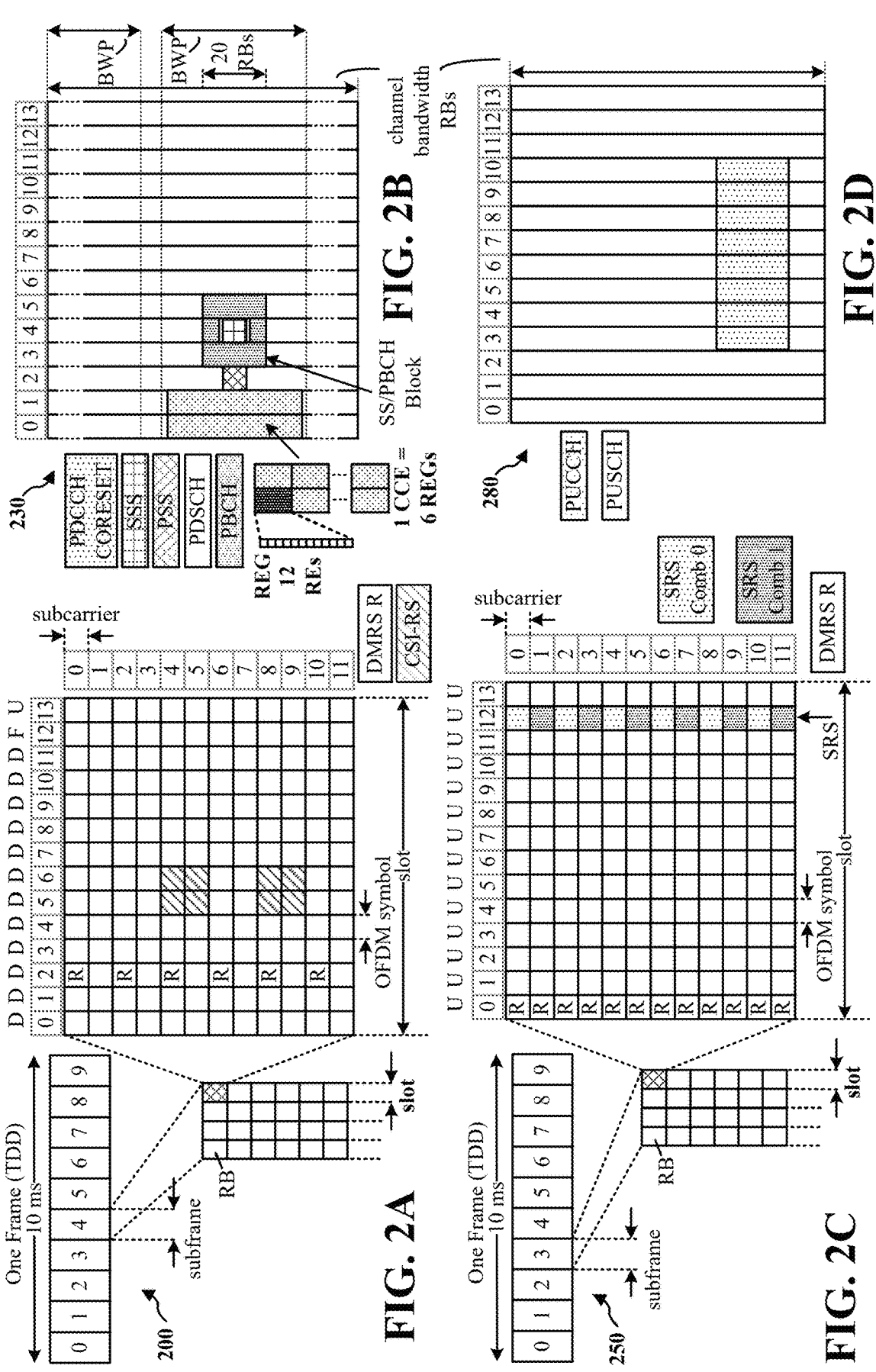
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| $\mu$ | SCS $\Delta f = 2^{\mu} \cdot 15 [\text{kHz}]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK)

feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
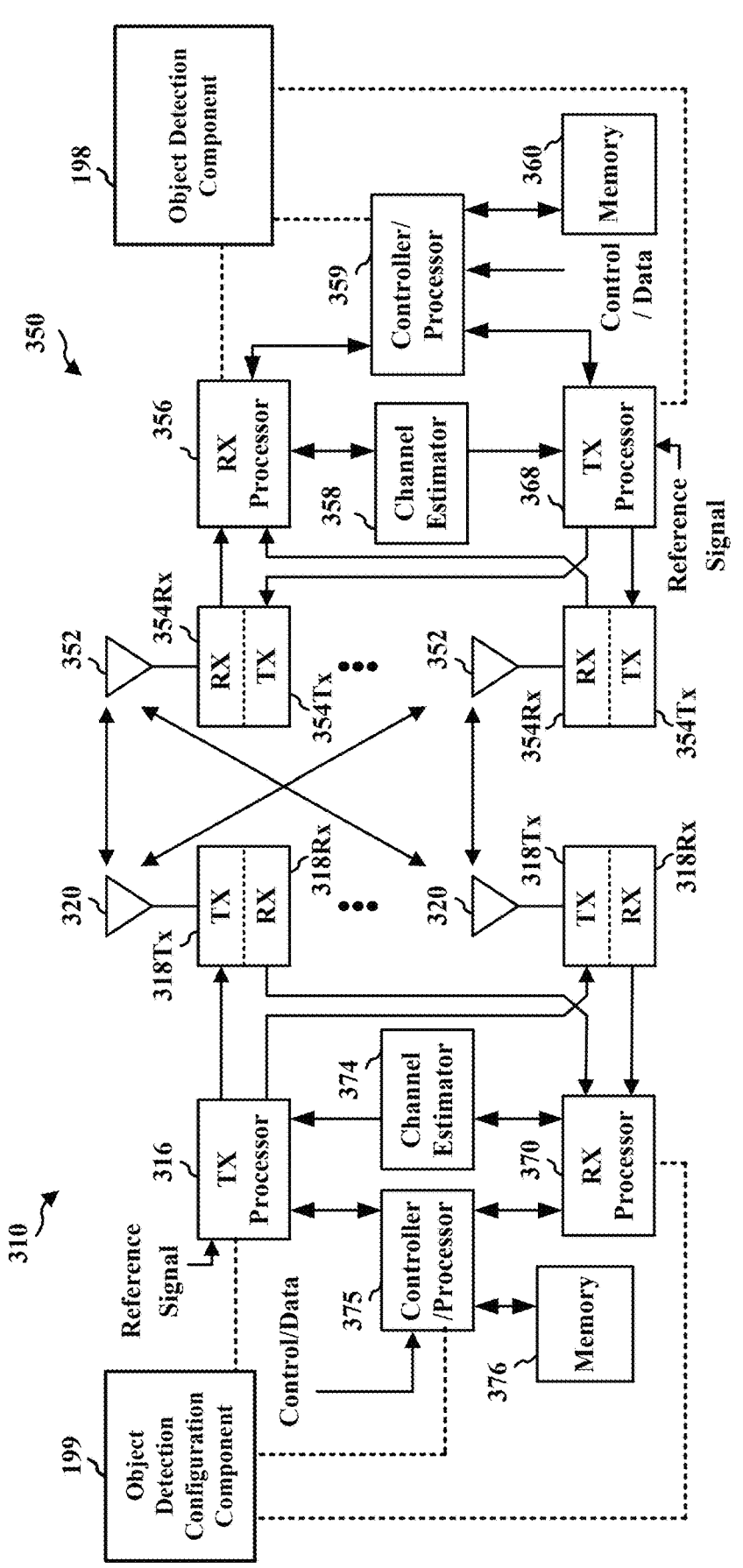
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data.

The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the object detection component 198 of FIG. 1.

At least one of the TX processor 316, the RX processor 370, and the controller/processor 375 may be configured to perform aspects in connection with the object detection configuration component 199 of FIG. 1.

Figure 4:
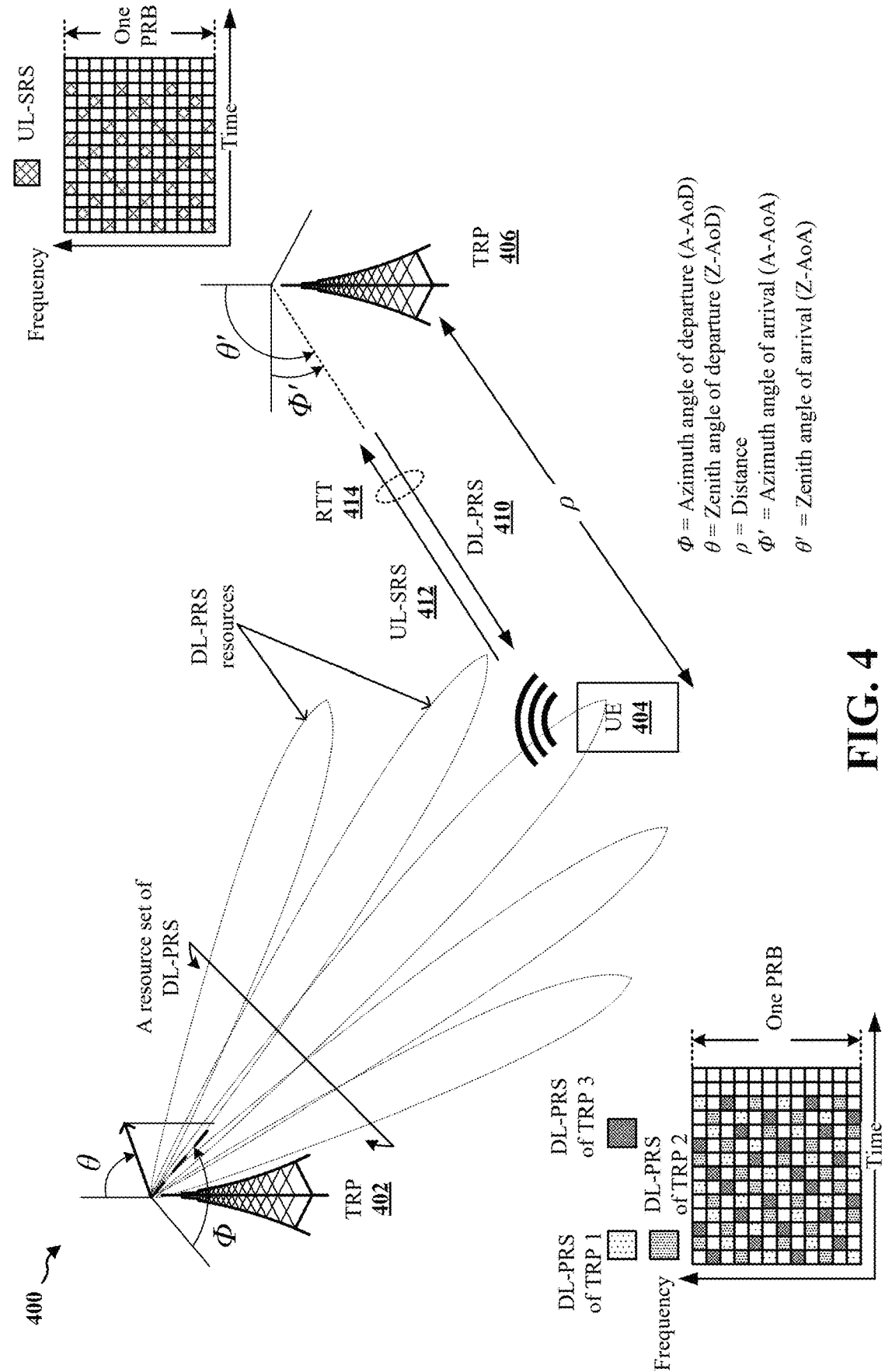
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX}-T_{PRS\_TX}\|-\|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS." In addition, the term "location" and "position" may be used interchangeably throughout the specification, which may refer to a particular geographical or a relative place.

In addition to Global Navigation Satellite Systems (GNSS)-based positioning and network-based positioning (e.g., as described in connection with FIG. 4), various camera-based positioning has also been developed to provide alternative/additional positioning mechanisms/modes. Camera-based positioning, which may also be referred to as "camera-based visual positioning," "visual positioning" and/or "vision-based positioning," is a positioning mechanism/mode that uses images captured by at least one camera to determine the location of a target (e.g., a UE or a transportation that is equipped with the at least one camera, an object that is in view of the at least one camera, etc.). For example, images captured by the dashboard camera (dash cam) of a vehicle may be used for calculating the three-dimensional (3D) position and/or 3D orientation of the vehicle while the vehicle is moving. Similarly, images captured by the camera of a mobile device may be used for estimating the location of the mobile device user or the location of one or more objects in the images. In another example, a camera (or a UE) may determine its position by matching object(s) in images captured by the camera with object(s) in a map (e.g., a high-definition (HD) map), such as specified buildings, landmarks, etc. In some implementations, camera-based positioning may provide centimeter-level and 6-degrees-of-freedom (6DOF) positioning. 6DOF may refer to a representation of how an object moves through 3D space by either translating linearly or rotating axially (e.g., 6DOF=3D position+3D attitude). For example, a single-degree-of-freedom on an object may be controlled by the up/down, forward/back, left/right, pitch, roll, or yaw. Camera-based positioning has a great potential for various applications, especially in satellite signal (e.g., GNSS/GPS signal) degenerated/unavailable environments and/or for autonomous driving.

In some scenarios, images captured by a camera may also be used for improving the accuracy/reliability of other positioning mechanisms/modes (e.g., the GNSS-based positioning, the network-based positioning, etc.), which may be referred to as "vision-aided positioning," "camera-aided positioning," "camera-aided location," and/or "camera-aided perception," etc. For example, while GNSS and/or inertial measurement unit (IMU) may provide good positioning/localization performance, when GNSS measurement outage occurs, the overall positioning performance might degrade due to IMU bias drifting. Thus, images captured by the camera may provide valuable information to reduce errors. For purposes of the present disclosure, a positioning session (e.g., a period of time in which one or more entities are configured to determine the position of a UE) that is associated with camera-based positioning or camera-aided positioning may be referred to as a camera-based positioning session or a camera-aided positioning session. In some examples, the camera-based positioning and/or the camera-aided positioning may be associated with an absolute position of the UE, a relative position of the UE, an orientation of the UE, or a combination thereof.

Figure 5:
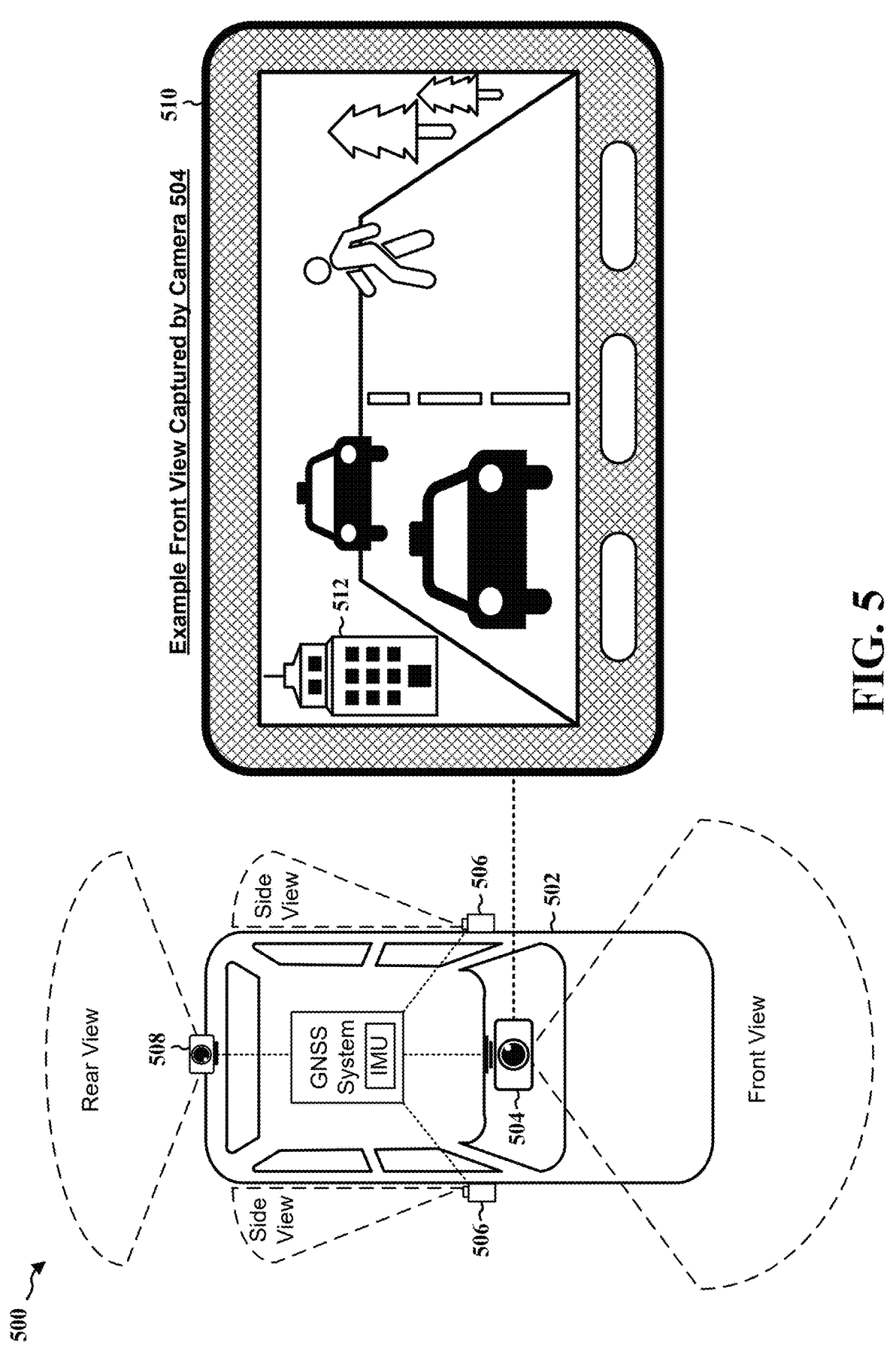
FIG. 5 is a diagram illustrating an example of camera-aided positioning in accordance with various aspects of the present disclosure.

FIG. 5 is a diagram 500 illustrating an example of camera-aided positioning in accordance with various aspects of the present disclosure. A vehicle 502 may be equipped with a GNSS system and a set of cameras, which may include a front camera 504 (for capturing the front view of the vehicle 502), side cameras 506 (for capturing the side views of the vehicle 502), and/or a rear camera 508 (for capturing the front view of the vehicle 502), etc. In some examples, the GNSS system may further include or be associated with at least one IMU (e.g., a GNSS+IMU system). While FIG. 5 uses the vehicle 502 as an example, it is merely for illustration purposes. Aspects presented herein may also apply to other types of transportations (e.g., motorcycles, bicycles, buses, trains, etc.), devices (e.g., UEs on pedestrians), and/or positioning mechanisms/modes (e.g., network-based positioning described in connection with FIG. 4). In addition, for purposes of the present disclosure, a positioning mechanism/mode (e.g., GNSS-based positioning, network-based positioning, etc.) that uses at least one sensor (e.g., an IMU, a camera) to assist the positioning may be referred to as a sensor fusion positioning.

The GNSS system may estimate the location of the vehicle 502 based on receiving GNSS signals transmitted from multiple satellites (e.g., based on performing GNSS-based positioning). However, when the GNSS signals are not available or weak, such as when the vehicle 502 is in an urban area or in a tunnel, the estimated location of the vehicle 502 may become inaccurate. Thus, in some implementations, the set of cameras on the vehicle 502 may be used for assisting the positioning, such as for verifying whether the location estimated by the GNSS system based on the GNSS signals is accurate. For example, as shown at 510, images captured by the front camera 504 of the vehicle 502 may include/identify a specific building 512 (which may also be referred to as a feature) that is with a known location, and the vehicle 502 (or the GNSS system or a positioning engine associated with the vehicle 502) may determine/verify whether the location (e.g., the longitude and latitude coordinates) estimated by the GNSS system is in proximity to the known location of this specific building 512. Thus, with the assistance of the camera(s), the accuracy and reliability of the GNSS-based positioning may be further improved. For purposes of the present disclosure, a GNSS system that is associated with a camera (e.g., capable of performing camera-aided/based positioning) may be referred to as a "GNSS+camera system," or a "GNSS+IMU+camera system" (if the GNSS system is also associated with/includes at least one IMU).

In some examples, a software or an application that accepts positioning related measurements from GNSS chipsets and/or sensors to estimate position, velocity, and/or altitude of a device may be referred to as a positioning engine. In addition, a positioning engine that is capable of achieving certain high level of accuracy (e.g., centimeter/decimeter level accuracy) and/or latency may be referred to as a precise positioning engine (PPE). For example, a positioning engine that is capable of performing real-time kinematic positioning (RTK) (e.g., receiving or processing correction data associated with RTK) may be considered as a PPE. Another example of PPE is a positioning engine that is capable of performing precise point positioning (PPP). PPP is a positioning technique that removes or models GNSS system errors to provide a high level of position accuracy from a single receiver.

In some examples, a software or an application that accepts positioning related measurements from global navigation satellite system (GNSS)/global positioning system (GPS) chipsets and/or sensors to estimate position, velocity, and/or altitude of a device may be referred to as a positioning engine (PE). In addition, a positioning engine that is capable of achieving certain high level of accuracy (e.g., centimeter/decimeter level accuracy) and/or latency may be referred to as a precise positioning engine (PPE). On the other hand, a navigation application may refer to an application in a user equipment (e.g., a smartphone, an in-vehicle navigation system, a GPS device, etc.) that is capable of providing navigational directions in real time. Over the last few years, users have increasingly relied on navigation applications because they have provided various benefits. For example, navigation applications may provide convenience to users as they enable users to find a way to their destinations, and also allow users to contribute information and mark places of importance thereby generating the most accurate description of a location. In some examples, navigation applications are also capable of providing expert guidance for users, where a navigation application may guide a user to a destination via the best, most direct, or most time-saving routes. For example, a navigation application may obtain the current status of traffic, and then locate a shortest and fastest way for a user to reach a destination, and also provide approximately how long it will take the user to reach the destination. As such, a navigation application may use an Internet connection and a GPS/GNSS navigation system to provide turn-by-turn guided instructions on how to arrive at a given destination.

Figure 6:
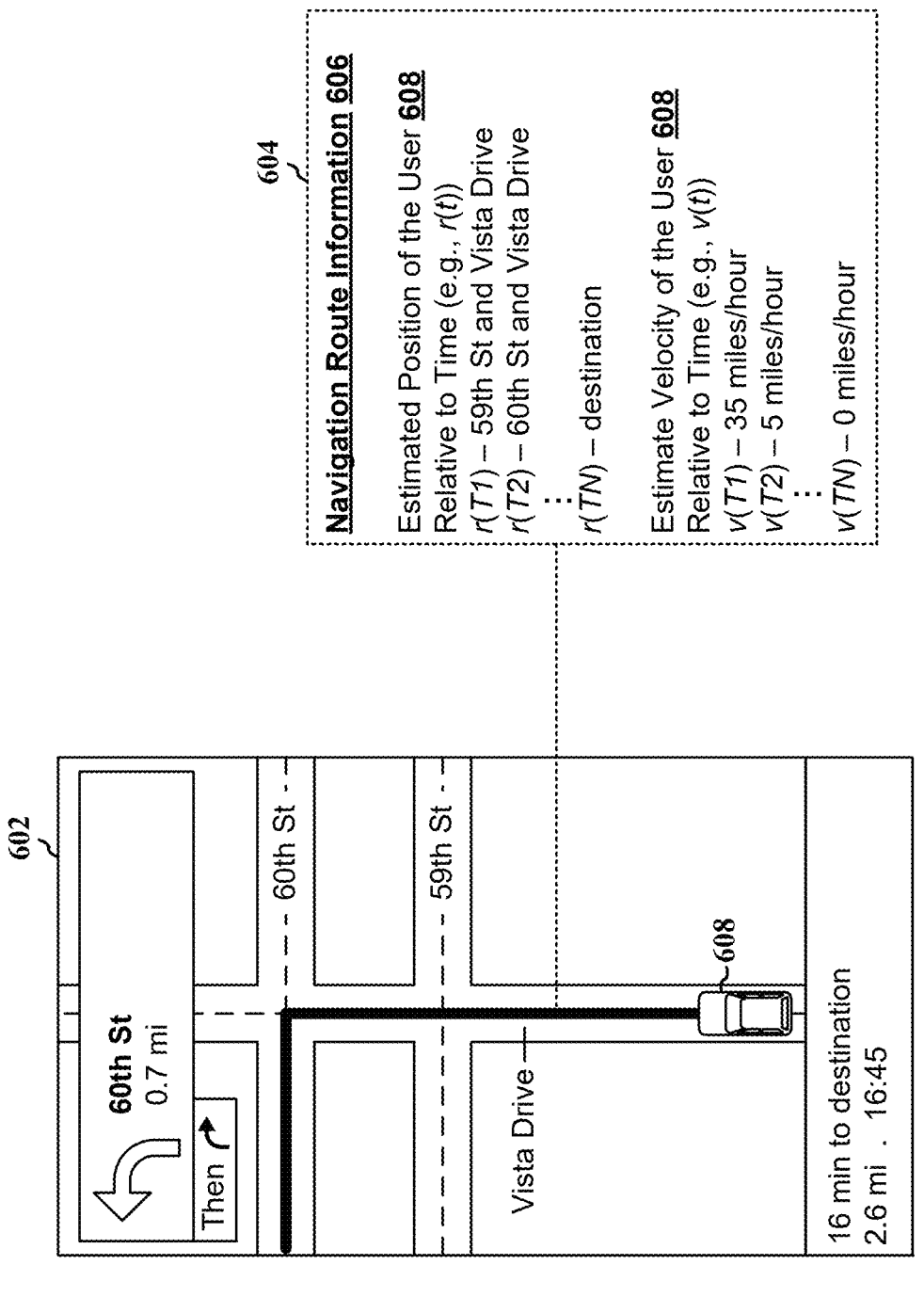
FIG. 6 is a diagram illustrating an example of a navigation application in accordance with various aspects of the present disclosure.

FIG. 6 is a diagram 600 illustrating an example of a navigation application in accordance with various aspects of the present disclosure. As shown at 602, a navigation application, which may be running on a UE such as a vehicle (e.g., a built-in GPS/GNSS system of the vehicle) or a smartphone, may provide a user (e.g., via a display or an interface) with turn-by-turn directions to a destination and an estimated time to reach the destination based on real-time information. For example, the navigation application may receive/download real-time traffic information, road condition information, local traffic rules (e.g., speed limits), and/or map information/data from a server. Then, the navigation application may calculate a route to the destination based on at least the map information and other available information. The map information may include the map of the area in which the user is traveling, such as the streets, buildings, and/or terrains of the area, or a map that is compatible with the navigation application and GPS/GNSS system. In some examples, the route calculated by the navigation application may be the shortest or the fastest route. For purposes of the present disclosure, information associated with this calculated route may be referred to as navigation route information. For example, navigation route information may include predicted/estimated positions, velocities, accelerations, directions, and/or altitudes of the user at different points in time.

For example, as shown at 604, based on the map information, the speed limit, and the real-time road condition information, the navigation application may generate navigation route information 606 that guides a user 608 to a destination. In some examples, the navigation route information 606 may include the position of the user and velocity of the user relative/respect to time, which may be denoted as $\vec{r}(t)$ and $\vec{v}(t)$, respectively. For example, the navigation application may estimate that at a first point in time (T1), the user may reach a first point/place with certain speed (e.g., the intersection of 59th Street and Vista Drive with a velocity of 35 miles per hour), and at a second point in time (T2), the user may reach a second point/place with certain speed (e.g., the intersection of 60th Street and Vista Drive with a velocity of 15 miles per hour), and up to $N^{th}$ point in time (TN), etc.

In recent years, vehicle manufacturers have been developing vehicles with assisted driving and/or autonomous driving capabilities. Assisted driving, which may also be called advanced driver assistance systems (ADAS), may refer to a set of technologies designed to enhance vehicle safety and improve the driving experience by providing assistance and automation to the driver. These technologies may use various sensor(s), camera(s), and other components to monitor a vehicle's surroundings and assist the driver of the vehicle with certain driving tasks. For example, some features of assisted driving systems may include: (1) adaptive cruise control (ACC) (e.g., a system that automatically adjusts a vehicle's speed to maintain a safe following distance from the vehicle ahead), (2) lane-keeping assist (LKA) (e.g., a system that uses cameras to detect lane markings and helps keep the vehicle centered within the lane, and provides steering inputs to prevent unintentional lane departure), (3), autonomous emergency braking (AEB) (e.g., a system that detects potential collisions with obstacles or pedestrians and automatically apply the brakes to avoid or mitigate the impact), (4) blind spot monitoring (BSM) (e.g., a system that uses sensors to detect vehicles in a driver's blind spots and provides visual or audible alerts to avoid potential collisions during lane changes), (5) parking assistance (e.g., a system that assists drivers in parking their vehicles by using camera(s) and sensor(s) to help with parallel parking or maneuvering into tight spaces), and/or traffic sign recognition (e.g., camera(s) and image processing are used to recognize and display traffic signs such as speed limits, stop signs, and other road regulations on the vehicle's dashboard).

Autonomous driving, which may also be called as self-driving or driverless technology, may refer to the ability of a vehicle to navigate and operate itself without specifying human intervention (e.g., without a human controlling the vehicle). The goal of the autonomous driving is to create vehicles that are capable of perceiving their surroundings, making decisions, and controlling their movements, all without the direct involvement of a human driver. To achieve or improve the autonomous driving, a vehicle may be specified to use a map (or map data) with detailed information, such as a high-definition (HD) map. An HD map may refer to a highly detailed and accurate digital map designed for use in autonomous driving and ADAS. In one example, HD maps may typically include one or more of: (1) geometric information (e.g., precise road geometry, including lane boundaries, curvature, slopes, and detailed 3D models of the surrounding environment), (2) lane-level information (e.g., information about individual lanes on the road, such as lane width, lane type (e.g., driving, turning, or parking lanes), and lane connectivity), (3) road attributes (e.g., data on road features like traffic signs, signals, traffic lights, speed limits, and road markings), (4) topology (e.g., information about the relationships between different roads, intersections, and connectivity patterns), (5) static objects (e.g., locations and details of fixed objects along the road, such as buildings, traffic barriers, and poles), (6) dynamic objects (e.g., real-time or frequently updated data about moving objects, like other vehicles, pedestrians, and cyclists), and/or (7) localization and positioning: precise reference points and landmarks that help in accurate vehicle localization on the map, etc.

To enable a vehicle to be capable of providing assisted driving and/or autonomous driving, the vehicle may be configured to use various machine learning (ML) frameworks. An ML framework may refer to a set of tools, libraries, and/or software components that are configured to provide a structured way to design, build, and deploy ML models and applications. These frameworks may be able to simplify the process of developing ML algorithms and applications by providing a foundation of pre-built functions, algorithms, and utilities. They may typically include features for data preprocessing, model training, evaluation, and/or deployment, etc. ML frameworks may come in various programming languages, and they may be configured to cater to different types of machine learning tasks, including supervised learning, unsupervised learning, and/or reinforcement learning, etc. An ML model may refer to a mathematical representation of a real-world process or problem, created using ML algorithms and techniques. These ML models may be configured to make predictions, classify data, and/or solve specific tasks based on patterns and relationships learned from input data. A deep learning framework may refer to a specialized software library or toolset that provides specified components and abstractions for building, training, and deploying deep neural networks. Deep learning frameworks may be designed to facilitate the development of complex neural network models, especially deep neural networks with multiple layers. These frameworks may offer a wide range of pre-implemented layers, optimizers, loss functions, and other components, making it easier for researchers and developers to work with deep learning models.

Figure 7:
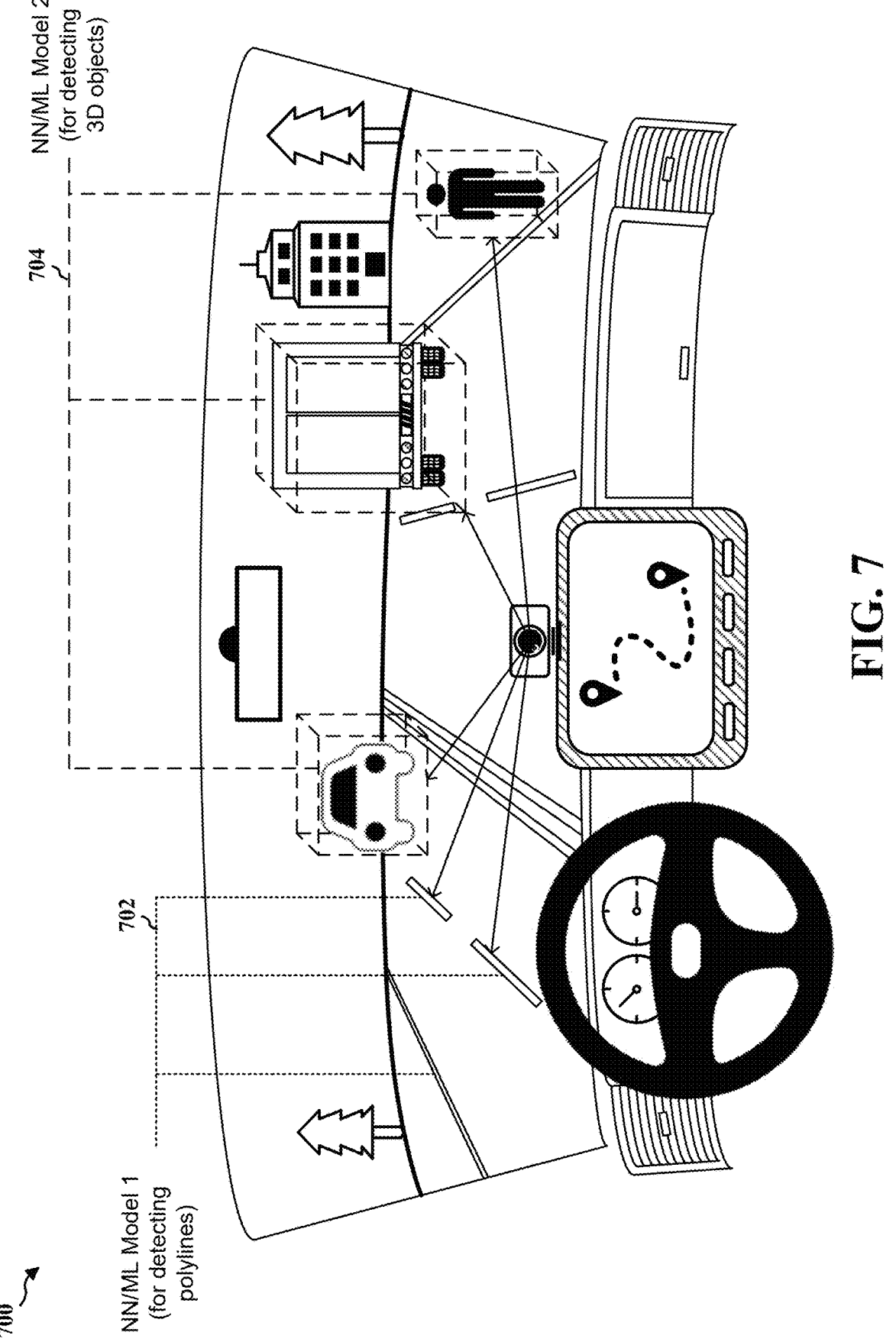
FIG. 7 is a diagram illustrating an example of utilizing multiple neural network (NN) models and/or machine learning (ML) models for object detection in accordance with various aspects of the present disclosure.

FIG. 7 is a diagram 700 illustrating an example of utilizing multiple neural network (NN) models and/or ML models for object detection in accordance with various aspects of the present disclosure. In many typical/existing deep learning frameworks associated with object detections (e.g., road object detections), polyline detection (e.g., lane detection, road detection, etc.) and three-dimensional (3D) object detection (3DOD) tasks may be configured to be treated or processed independently, such as training or using separated/different neural network (NN) models and/or ML models to perform each task. For example, as shown at 702, a first NN/ML model (NN/ML Model 1) or a first deep neural network may be trained/used to detect and track polylines from input images, while a second NN/ML model (NN/ML Model 2) or a second deep neural network may be trained/used to detect and track objects in a 3D space (e.g., to perform 3DOD task), such as shown at 704. Then, the outputs of these two NN/ML models may be processed independently without an association between them.

In some scenarios, when different object detection tasks are performed by different NN/ML models independently, there may be a misalignment between the outputs of the NN/ML models. For example, as shown by a diagram 800A of FIG. 8A, the polylines detected by the first NN/ML model (e.g., as described in connection with 702 of FIG. 7) may not be aligned with the 3D objects detected by the second NN/ML model (e.g., as described in connection with 704 of FIG. 7). Thus, some of the 3D objects (e.g., the car and the truck) may seem to be travelling between two lanes (e.g., on top of the traffic lines) when outputs from the first NN/ML model and the second NN/ML model are passed to an application or a device (e.g., an autonomous driving application/device, a positioning application/device, etc.).

However, if different object detection tasks (e.g., the polyline detection task and the 3DOD task) performed by different NN/ML models are combined, an application or a device receiving outputs from these NN/ML models may be able to associate detected object(s) (e.g., a vehicle, a pedestrian, etc.) and their movements/positions with respect to lane boundaries (e.g., the detected polylines), which may be specified or crucial for various applications such as autonomous driving and ADAS, etc. For example, as shown by a diagram 800B of FIG. 8B, an association between the polyline detection task and the 3DOD task may also improve the accuracy of both tasks individually. For instance, a 3DOD model (e.g., referring to an NN/ML model trained to perform 3DOD such as the second NN/ML model) may use the lane boundary information from a polyline detection model (e.g., referring to an NN/ML model trained to perform polyline detection such as the first NN/ML model) to improve the accuracy of object detection by reducing false positives and improving localization accuracy. For example, if the 3DOD model detects an object outside a lane boundary, the 3DOD model may be used to adjust the lane boundary accordingly to avoid incorrect lane markings. Similarly, if the 3DOD model detects an object that is partially inside the lane boundary, the 3DOD model may be used to adjust the polylines to accurately represent the lane boundary and avoid any potential collision. As such, the association between the polyline detection task and the 3DOD tasks may greatly benefit both object detection tasks by improving their accuracy and robustness.

The polyline detection model may also be benefitted from the 3DOD model's ability to detect a vehicle's position accurately and adjust the lane boundary accordingly, such as in complex road scenarios (e.g., a road with multiple lanes and high traffics). This may enable the polyline detection model to provide more accurate and robust lane boundary information, which may in turn benefit various applications such as lane departure warning systems and autonomous driving systems, etc. Thus, it may be beneficial to provide an association between polyline detection and 3DOD tasks to accurately track a vehicle's position and movement inside the lane boundary, which may be utilized by various applications in autonomous driving, advanced driver assistance systems, and traffic analysis, etc. Note while the examples shown in FIGS. 7, 8A, and 8B are illustrated with vehicles, pedestrians, and traffic lines, they may also apply to other road objects or traffic elements, such as traffic light(s), road sign(s), and/or road construction display(s), etc.

Aspects presented herein may improve the accuracy and reliability of object detections performed by multiple object detection models (e.g., NN/ML model) by enabling detection tasks performed by different object detection models to be combined (e.g., processed jointly). In one aspect of the present disclosure, a polyline detection model may be configured to be associated with a 3D object detection model, such that outputs from one detection model may be used to improve and/or adjust outputs of another detection model. For example, the 3D object detection model may use the lane boundary information from the polyline detection model to improve the accuracy of 3D object detection by reducing false positives and improving localization accuracy. Similarly, based on the 3D object detection model's ability to detect positions of 3D objects accurately, the polyline detection model may use the outputs from the 3D object detection model to adjust the lane boundary accordingly.

Figure 9:
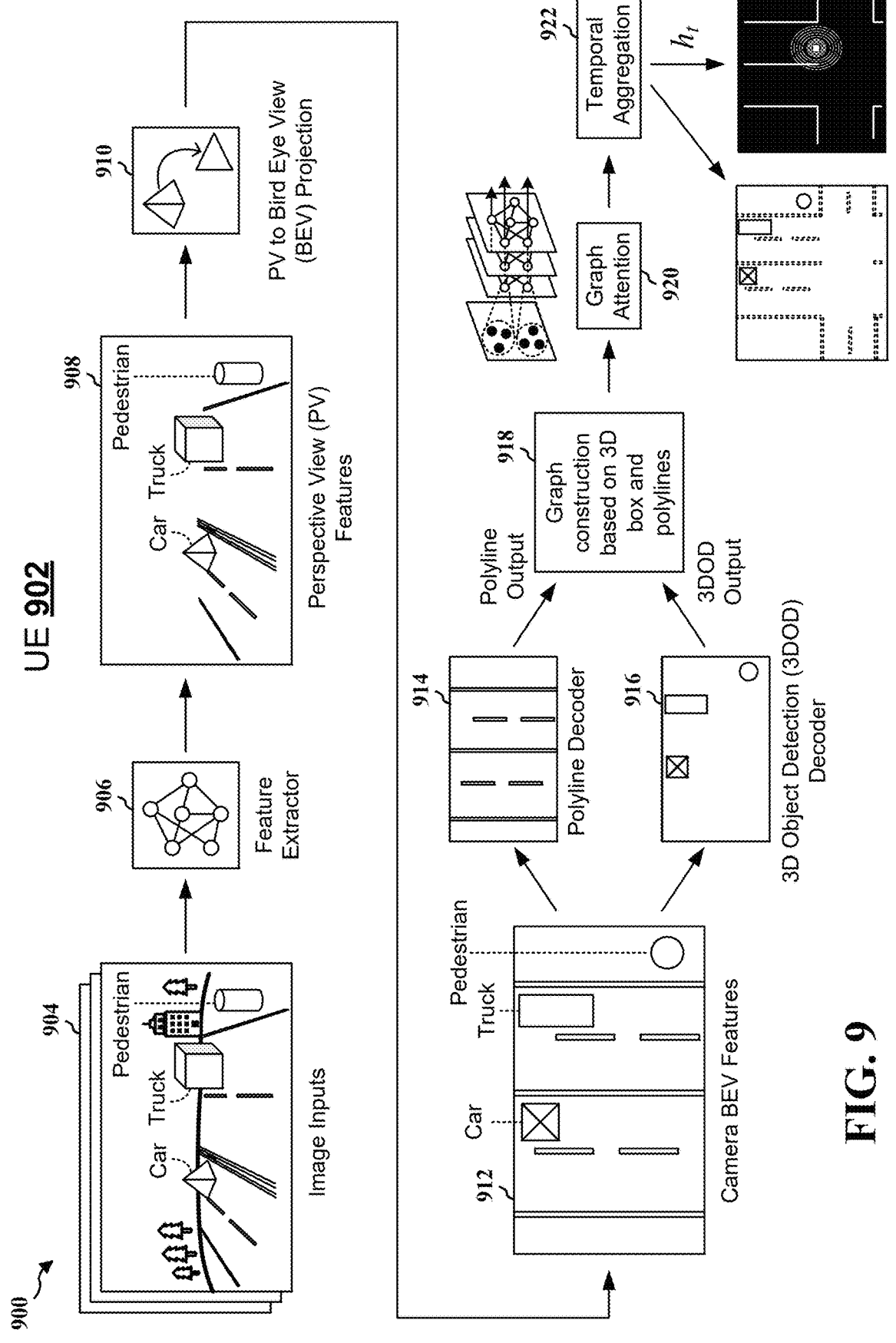
FIG. 9 is a diagram illustrating an example framework that is capable of associating multiple object detection models with each other in accordance with various aspects of present disclosure.

FIG. 9 is a diagram 900 illustrating an example framework that is capable of associating multiple object detection models with each other in accordance with various aspects of present disclosure. Aspects presented herein may be performed by a vehicle (which may also be referred to as a vehicle UE), an ADAS of the vehicle, an on-board unit (OBU) of the vehicle, an image processing device associated with the vehicle, at least one camera, and/or a set of NN/ML models, etc. (collectively as a "UE 902" for purposes of illustration). In some examples, different tasks may be performed by different entities, such as by a network entity (e.g., an online server).

At 904, the UE 902 may obtain a set of images from at least one camera (which may also be referred to as image inputs). For example, as discussed in connection with FIG. 5, the vehicle 502 may use its front camera 504 to capture the front views of the vehicle 502, and/or use its rear camera 508 to capture the rear views of the vehicle 502, etc.

At 906, the UE 902 may be configured to extract a set of features from the set of images, such as by using a feature extractor module (which may be an NN/ML model). For example, as shown at 908, the set of features may be a set of perspective view (PV) features related to the driving and roads, such as vehicles, traffics objects (e.g., traffic lines, road signs, traffic lights, traffic equipments, etc.), pedestrians, animals, and/or anything that may typically be presented on roads, etc.

At 910, the UE 902 may convert the set of features (e.g., the set of PV features) to a set of bird's eye view (BEV) features. For purposes of the present disclosure, a BEV may refer to an elevated view of an object or a location from a steep viewing angle, creating a perspective as if the observer were a bird in flight looking downwards. For example, BEVs may be aerial photograph, and/or drawing used in the making of blueprints, floor plans and maps, etc. For example, as shown at 912, the PV features (e.g., 3D features) extracted from the set of images shown at 908 may be projected to a 2D plane as a set of BEV features.

In one aspect of the present disclosure, the UE 902 may be configured to perform polyline and 3DOD output attribute predictions based on the set of BEV features. For example, as described in connection with 904 to 912, to obtain a camera's BEV features, a set of camera images may be provided to a residual network (ResNet), a convolutional neural network (CNN), and/or an ML model to extract PV features. Then, the UE 902 (or the NN/ML model) may use a lift, splat, shoot (LSS) technique to transform the PV (or visual) features into a BEV space (e.g., a 2D plane). For purposes of the present disclosure, a lift, splat, shoot technique may refer to a rendering technique used in computer graphics and video game development, particularly in the context of real-time graphics rendering. This technique may be associated with ray tracing and may be used to create realistic lighting and reflections in computer-generated images and scenes. "Lift" may refer to the process of casting a ray from a point in the 3D scene (usually a camera's position) to determine what is visible from that point. This step may involve determining which objects or surfaces in the scene are visible from the given viewpoint and which are hidden by other objects. "Splat" may refer to the process of projecting or "splatting" information onto the visible surfaces or objects in the scene. This information may typically include things like lighting, shading, textures, and other visual attributes. It may involve determining how light interacts with the visible surfaces and what color or appearance each pixel should have. "Shoot" may refer to the process of generating pixels for the final rendered image based on the information gathered in the previous steps. In this step, each pixel's color and attributes may be determined based on the information obtained during the "Lift" and "Splat" phases. This information is then used to produce the final image that is displayed on the screen.

For example, as shown at 914, the UE 902 may use a polyline detection module (e.g., a polyline decoder, a map decoder, etc.) to detect lane boundaries from the set of BEV features, which may output a set of polylines {L}. For purposes of the present disclosure, a polyline detection may refer to a process of identifying and extracting polylines from digital images or other types of data. A polyline may be a geometric shape that consists of a series of connected line segments, typically used to represent continuous curves or paths. Polylines may be used in various fields, including computer graphics, computer-aided design (CAD), geographic information systems (GIS), and image processing, etc. For example, in the field of road and network mapping, a polyline detection model may be used for detecting road networks or other linear features (e.g., rivers or utility lines) from aerial or satellite images to create accurate maps and navigation systems. In some implementations, the polyline detection module may be a CNN or an ML model that is trained using a supervised learning approach, where the ground truth polylines are manually annotated for each image in the training dataset. The output of the polyline detection module may be a set of polylines represented as a sequence of ordered points: $\{L\}=[L_1, L_2, L_3, \ldots, L_n]$, and each polyline $L_i$ may be represented as a set of ordered points: $L_i=[p_{i1}, p_{i2}, p_{i3}, \ldots, p_{ik}]$ where k is the number of points in a polyline.

Then, as shown at 916, the UE 902 may use a 3D object detection (3DOD) module (e.g., a CenterPoint decoder) to detect 3D objects in the set of images (e.g., the input images) in the BEV space. For purposes of the present disclosure, a 3D object detection may refer to a process that involves identifying and locating objects in a 3D space. The 3D object detection may provide information about an object's position, orientation, and dimensions in a 3D world. Similarly, the 3DOD module may be a CNN or an ML model (e.g., different from the CNN or the ML model used for polyline detection) that is capable of taking the same input images as the polyline detection module and outputting a set of 3D object detections {O}. Each 3D object detection may be represented as a tuple containing an object's position (x, y, z) and dimensions (length, width, height, velocities, yaw):

O=(x, y, z, length, width, height, $v_x$, $v_y$, yaw), and the output of the 3DOD module may be a set of 3D object detections: {O}=[$O_1$, $O_2$, $O_3$, . . . , $O_n$].

At 918, the UE 902 may construct a graph (e.g., performing a graph construction) based on the outputs from the polyline detection module (e.g., {L}=[$L_1$, $L_2$, $L_3$, . . . , $L_n$]) and the 3DOD module (e.g., {O}=[$O_1$, $O_2$, $O_3$, . . . , $O_m$]). The graph construction may include creating nodes and edges to represent the polyline detections and 3D object detections, such that the UE 902 may create/build a unified graph from 3D bounding boxes and vectorized polylines.

In one example, to create the nodes, the UE 902 may be configured to first create a set of nodes $V_t$ for each time step t, where each node may represent a polyline detection or a 3D object detection. Also, each node may be represented as a feature vector $x_{i,t}$, which may contain information related to the properties of the polyline detection or the 3D object detection, such as its location, size, and/or orientation, etc. In some implementations, the feature vector $x_{i,t}$ may be computed using small resident network (ResNet) blocks or a similar feature extractor such as a multilayer perceptron feature extractor.

Then, to encode the polyline detection outputs and the 3D object detection outputs to a feature vector, the UE 902 may be configured to use a combination of geometric and semantic features. For example, for the polyline detection outputs, the UE 902 may be configured to use the coordinates of the vertices in the polyline as geometric features. As an illustration, assuming that a polyline is represented by a sequence of 2D coordinates ($x_1$, $y_1$), ($x_2$, $y_2$), . . . , ($x_n$, $y_n$), where n is the number of vertices in the polyline. The geometric feature vector $g_{p,i} \in R^{2n}$ for the $i^{th}$ polyline may be computed based on: $g_{p,i}$=[$x_1$, $y_1$, $x_2$, $y_2$, . . . , $x_n$, $y_n$].

On the other hand, for the 3D object detection outputs, the UE 902 may be configured to use both geometric features and semantic features. For example, geometric features may include the location, the size, and/or the orientation of a 3D object, which may be represented as a 7-dimensional vector (x, y, z, l, w, h, $\theta$). Semantic features may include an object class, a confidence score, and/or other attributes such as whether an object is moving or stationary, etc. The geometric features and the semantic features may be concatenated to form the feature vector $g_{o,i} \in R^{C_o}$ for the $i^{th}$ 3D object detection: $g_{o,i}$=[x, y, z, l, w, h, $\theta$, $c_1$, $c_2$, . . . , $c_m$], where $c_1$, $c_2$, . . . , $c_m$ may represent the semantic features. After obtaining the geometric feature vectors and the semantic feature vectors for each polyline detection and/or each 3D object detection, the feature vectors may be concatenated together to form a final feature vector for each node: $x_{i,t}$=[$g_{p,i}$, $g_{o,i}$], where $g_{p,i}$ and $g_{o,i}$ may represent the geometric feature vectors and the semantic feature vectors for the $i^{th}$ node, respectively.

To create the edges, a distance metric $d(x_{i,t}, x_{j,t})$ may be defined between the feature vectors of two nodes $x_{i,t}$ and $x_{j,t}$. If the distance is below a defined threshold, an edge may be created between the two nodes: $W_{ij,t}$=1, if $d(x_{i,t}, x_{j,t})$<threshold and $W_{ij,t}$=0 otherwise. The distance metric may be used to compute the pairwise distances between the feature vectors of the nodes representing the polyline detections and the 3D object detections. These pairwise distances may then be used to construct the edges in a graph, where each edge may connect two nodes that are close to each other in a feature space. A feature space, which may also be known as a feature representation or a feature vector space, may refer to a mathematical abstraction used in various fields, including machine learning, pattern recognition, and data analysis. For example, a feature space may be a multidimensional space where each dimension may correspond to a specific feature or attribute extracted from a dataset (e.g., an image) or an object.

In one implementation, the distance metric used in the graph construction maybe based on a Euclidean distance between the feature vectors of the nodes. For example, assuming there are two nodes i and j with feature vectors $x_{i,t}$ and $x_{j,t}$, respectively, at time t. The Euclidean distance ($d_{i,j,t}$) between the two feature vectors may be computed based on: $d_{i,j,t} = \sqrt{\Sigma_{k=1}^{K}(x_{i,t}(k)-x_{j,t}(k))^2}$, where K is the dimension of the feature vector. The distance metric may be normalized to be between zero (0) and one (1) using a min-max normalization:

$$d'_{i,j,t} = \frac{d_{i,j,t} - \min_{i,j} d_{i,j,t}}{\max_{i,j} d_{i,j,t} - \min_{i,j} d_{i,j,t}}.$$

This normalized distance metric may then be used as an edge weight in a graph construction. The use of the distance metric may enable the framework (e.g., the framework that is capable of associating multiple object detection models as discussed in FIG. 9) to capture spatial relationships between the polyline detections and the 3D object detections, and also to create an association between them based on their proximity in a feature space.

An adjacency matrix $A_t$ may be constructed based on the distance metric between the feature vectors of the nodes at the time step t. In one example, the entries in the adjacency matrix may be determined by thresholding the pairwise distances between the nodes. For example, assuming there are N nodes at time t, with feature vectors denoted by $x_1$, $x_2$, . . . , $x_N$. The (i,j)th entry in the adjacency matrix $A_t$ may be defined as: $A_t(i,j)$=1, if $d_{i,j,t}'$<epsilon, where epsilon is a threshold parameter and $d_{i,j,t}'$ is the normalized distance metric between nodes i and j at time t.

Overall, an edge is added between nodes i and j at time t if their distance metric is below the defined threshold, indicating that they may be close to each other in the feature space. The resulting adjacency matrix $A_t$ may represent the edges between the nodes at time step t. This matrix may then be used to construct the graph for each time step, which may then be processed by a neural network (e.g., a graph neural network (GNN)) to improve the association between the polylines detections and the 3D object detections. Also, the graph at each time step t may then be represented as a tuple ($V_t$, $E_t$, $A_t$), where $V_t$ is the set of nodes, $E_t$ is the set of edges, and $A_t$ is the adjacency matrix. The UE 902 may be configured to use these graph representations as inputs to a graph-based framework for polyline detections and the 3D object detections.

At 920, the UE 902 may be configured to apply or to use a graph neural network (GNN) with an attention mechanism to update the polylines (e.g., the polyline detections) based on nearby 3D object detections (or based on 3D objects within a distance threshold). For example, a set of learnable parameters W may be defined to compute a weighted sum of the 3D object detections {O} that are close to each polyline in {L}. The GNN may learn the attention weights using a softmax function: $a_{ij}$=softmax($W_1$[$O_j$, $L_i$]+$W_2$[$O_j$, $L_j$]), where $a_{ij}$ represents the attention weight between the $j^{th}$ 3D object detection and the $i^{th}$ polyline, and $W_1$ and $W_2$ are the learnable parameters for computing the attention weights.

Then, the UE 902 or the GNN may use the computed attention weights to update each polyline based on the nearby 3D object detections using: $L_i'=W_3([L_i, \Sigma_{j=1}^{m} a_{ij}O_j])$, where $L_i'$ represents the updated polyline, and $W_3$ is a set of learnable parameters for updating the polyline. Similarly, the UE 902 or the GNN may also update the 3D object detections based on the nearby polyline detections using the same or similar attention mechanism, with the learnable parameters being specific to updating the 3D object detections instead of the polylines. This process may lead to a more accurate estimation of an object's (e.g., a vehicle's) position and movement inside the lane boundary by incorporating information from both the polyline detections and the 3D object detections in a mutually reinforcing manner.

At 922, the UE 902 or the GNN may further apply temporal aggregation to the graph attention (or the UE 902 or the GNN may apply graph attention with temporal aggregation). The temporal aggregation may be used for capturing the long-term dependencies between the polyline detections and the 3D object detections over time. To achieve this, the UE 902 or the GNN may be configured to aggregate a set of graph representations over multiple frames using a long short-term memory (LSTM) mechanism or an attention mechanism. For example, an LSTM mechanism or an attention mechanism may be used to compute a hidden state $h_t$ that captures the temporal dependencies between the graph representations over time: $h_t$=LSTM $(h_{(t-1)}, (V_t, E_t, A_t))$, where $h_{(t-1)}$ is the hidden state at the previous time step (t–1). Alternatively, an attention mechanism may be used to compute a weighted sum of the graph representations at each time step: $h_t$=Attention $(h_{(t-1)}, (V_t, E_t, A_t))$, where the Attention is a learnable function for computing the attention weights. The UE 902 or the GNN may then use the final hidden state $h_t$ to predict the polyline detections and the 3D object detections at the current time step t.

Overall, the polyline detections may be benefitted from the temporal aggregation with the attention mechanism. By incorporating the attention weights from nearby 3D object detections, the polyline detections may better capture an object's (e.g., a vehicle's) movement and trajectory within the lane boundaries. This may also improve the accuracy of lane keeping systems and reduce the risk of accidents caused by drifting out of the lane.

After applying the attention mechanism and/or the temporal aggregation, the UE 902 may output the resulted/updated polyline detections and/or 3D objects detections, such as to a navigation application or an autonomous driving application, etc., or store, in a memory or a cache, the resulted/updated polyline detections and/or 3D objects detections.

In typical deep learning (DL) frameworks, polylines and 3DOD tasks are treated independently. Associating polylines and 3DOD tasks can benefit both tasks by improving their accuracy and robustness (for example, to track an automobile's position and movement inside the lane boundary). Aspects presented herein enable determining polyline and 3DOD output attributes and constructing a unified graph by creating nodes and edges to represent the polylines and 3DOD. A graph neural network (GNN) is used to update the polylines based on the nearby 3DOD. Long-term dependencies between the polylines and 3DOD are captured over time. By integrating information from the polylines and 3DOD, automobile's position and movement inside the lane boundary can be accurately determined.

Aspects presented herein may improve the accuracy of road object detection. By integrating information from the polylines and 3D object detections, the framework may more accurately estimate an object's (e.g., a vehicle's) position and movement inside the lane boundary, which may be useful for various applications such as autonomous driving. Aspects presented herein may also provide or improve the polyline refinement. As 3D object detections may provide additional context to the polylines by capturing the spatial layout of the surrounding environment, this may help to disambiguate and refine the polylines using the GNN with attention mechanism, particularly in cluttered or complex scenes where it may be difficult to accurately infer the shape and orientation of objects from 2D image data alone. Also, by using GNNs and attention mechanism for temporal aggregation, the framework may capture long-term dependencies and improve the overall performance of the model. In addition, by utilizing the shared information between the 3DOD and polyline tasks, the framework described herein may generalize well to new environments and scenarios.

FIG. 10 is a flowchart 1000 of a method of image processing (or object detection). The method may be performed by a UE (e.g., the UE 104, 404, 902; the vehicle 502; the apparatus 1204). The method may improve the accuracy and reliability of object detection.

At 1004, the UE may detect (1) a set of polylines from at least one of a set of BEV features or a set of PV features associated with a set of images and (2) a set of 3D objects in the set of BEV features, such as described in connection with FIG. 9. For example, as discussed in connection with 914, the UE 902 may use a polyline detection module (e.g., a polyline decoder, a map decoder, etc.) to detect lane boundaries from the set of BEV features. Then, as discussed in connection with 916, the UE 902 may use a 3D object detection (3DOD) module (e.g., a CenterPoint decoder) to detect 3D objects in the set of images (e.g., the input images) in the BEV space. The detection of the set of polylines and/or the set of 3D objects may be performed by, e.g., the object detection component 198, the camera 1232, the transceiver(s) 1222, the cellular baseband processor(s) 1224, and/or the application processor(s) 1206 of the apparatus 1204 in FIG. 12.

In one example, to detect the set of polylines from the set of BEV features, the UE may detect a set of lane boundaries from the set of BEV features using a map decoder, and obtain the set of polylines based on the detected set of lane boundaries.

In another example, to detect (1) the set of polylines from at least one of the set of BEV features or the set of PV features associated with the set of images and (2) the set of 3D objects in the set of BEV features, the UE may detect the set of polylines from at least one of the set of BEV features or the set of PV features associated with the set of images and (2) the set of 3D objects in the set of BEV features using at least one convolutional neural network (CNN).

In another example, the UE may extract the set of PV features from the set of images prior to the detection, and convert the set of PV features to the set of BEV features, such as described in connection with FIG. 9. For example, at 904, the UE 902 may obtain a set of images from at least one camera (which may also be referred to as image inputs). At 906, the UE 902 may be configured to extract a set of features from the set of images, such as by using a feature extractor module (which may be a NN/ML model). For example, as shown at 908, the set of features may be a set of perspective view (PV) features related to the driving and roads, such as vehicles, traffics objects (e.g., traffic lines, road signs, traffic lights, traffic equipments, etc.), pedestrians, animals, and/or anything that may typically be presented on roads, etc. At 910, the UE 902 may convert the set of features (e.g., the set of PV features) to a set of bird's eye view (BEV) features. The extraction of the set of PV features and/or the conversion of the set of PV features to the set of BEV features may be performed by, e.g., the object detection component 198, the camera 1232, the transceiver(s) 1222, the cellular baseband processor(s) 1224, and/or the application processor(s) 1206 of the apparatus 1204 in FIG. 12.

At 1006, the UE may associate the set of polylines with the set of 3D objects, such as described in connection with FIG. 9. For example, as discussed in connection with 918, the UE 902 may construct a graph (e.g., performing a graph construction) based on the outputs from the polyline detection module and the 3DOD module. The association of the set of polylines with the set of 3D objects may be performed by, e.g., the object detection component 198, the camera 1232, the transceiver(s) 1222, the cellular baseband processor(s) 1224, and/or the application processor(s) 1206 of the apparatus 1204 in FIG. 12.

In one example, to associate the set of polylines with the set of 3D objects, the UE may construct at least one graph representing the set of polylines and the set of 3D objects by creating a plurality of nodes and a plurality of edges to represent the set of polylines and the set of 3D objects. In some implementations, each node in the plurality of nodes may include property information of a polyline in the set of polylines or a 3D object in the set of 3D objects. In some implementations, the property information may include at least one of: a location, a size, or an orientation of the polyline or the 3D object. In some implementations, to construct the at least one graph representing the set of polylines and the set of 3D objects by creating the plurality of nodes and the plurality of edges to represent the set of polylines and the set of 3D objects, the UE may compute a set of distances between feature vectors of the plurality of nodes representing the set of polylines and the set of 3D objects, and construct the plurality of edges based on the computed set of distances, where each edge in the plurality of edges may connect to at least two nodes in the plurality of nodes. In some implementations, the UE may aggregate the constructed at least one graph with other sets of graphs created from other sets of images at different times to capture a long-term dependency between the set of polylines and the set of 3D objects. In some implementations, to aggregate the constructed at least one graph with the other sets of graphs created from the other sets of images at the different times, the UE may aggregate the constructed at least one graph with the other sets of graphs created from the other sets of images at the different times using at least one of a long short-term memory (LSTM) mechanism or an attention mechanism.

At 1008, the UE may update the set of polylines based on a set of nearby 3D objects or update the set of 3D objects based on a set of nearby polylines. For example, as discussed in connection with 920, the UE 902 may be configured to apply or to use a graph neural network (GNN) with an attention mechanism to update the polylines (e.g., the polyline detections) based on nearby 3D object detections (or based on 3D objects within a distance threshold). Similarly, the UE 902 or the GNN may also update the 3D object detections based on the nearby polyline detections using the same or similar attention mechanism, with the learnable parameters being specific to updating the 3D object detections instead of the polylines. The update of the set of polylines and/or the set of 3D objects may be performed by, e.g., the object detection component 198, the camera 1232, the transceiver(s) 1222, the cellular baseband processor(s) 1224, and/or the application processor(s) 1206 of the apparatus 1204 in FIG. 12.

In one example, to update the set of polylines based on the set of nearby 3D objects, the UE may update the set of polylines based on the set of nearby 3D objects using a graph neural network (GNN) with an attention mechanism.

In another example, to update the set of 3D objects based on a set of nearby polylines, the UE may update the set of 3D objects based on the set of nearby polylines using a GNN with the attention mechanism.

At 1010, the UE may outputting an indication of the updated set of polylines or the updated set of 3D objects, such as described in connection with FIG. 9. For example, after applying the attention mechanism and/or the temporal aggregation, the UE 902 may output the resulted/updated polyline detections and/or 3D objects detections, such as to a navigation application or an autonomous driving application, etc. The output of the indication may be performed by, e.g., the object detection component 198, the camera 1232, the transceiver(s) 1222, the cellular baseband processor(s) 1224, and/or the application processor(s) 1206 of the apparatus 1204 in FIG. 12.

In one example, to output the indication of the updated set of polylines or the updated set of 3D objects, the UE may output, to a navigation application or an autonomous driving application, the indication of the updated set of polylines or the updated set of 3D objects.

In another example, to output the indication of the updated set of polylines or the updated set of 3D objects, the UE may store, in a memory or a cache, the indication of the updated set of polylines or the updated set of 3D objects.

FIG. 11 is a flowchart 1100 of a method of image processing (or object detection). The method may be performed by a UE (e.g., the UE 104, 404, 902; the vehicle 502; the apparatus 1204). The method may improve the accuracy and reliability of object detection.

At 1104, the UE may detect (1) a set of polylines from at least one of a set of BEV features or a set of PV features associated with a set of images and (2) a set of 3D objects in the set of BEV features, such as described in connection with FIG. 9. For example, as discussed in connection with 914, the UE 902 may use a polyline detection module (e.g., a polyline decoder, a map decoder, etc.) to detect lane boundaries from the set of BEV features. Then, as discussed in connection with 916, the UE 902 may use a 3DOD module (e.g., a CenterPoint decoder) to detect 3D objects in the set of images (e.g., the input images) in the BEV space. The detection of the set of polylines and/or the set of 3D objects may be performed by, e.g., the object detection component 198, the camera 1232, the transceiver(s) 1222, the cellular baseband processor(s) 1224, and/or the application processor(s) 1206 of the apparatus 1204 in FIG. 12.

In one example, to detect the set of polylines from the set of BEV features, the UE may detect a set of lane boundaries from the set of BEV features using a map decoder, and obtain the set of polylines based on the detected set of lane boundaries.

In another example, to detect (1) the set of polylines from at least one of the set of BEV features or the set of PV features associated with the set of images and (2) the set of 3D objects in the set of BEV features, the UE may detect the set of polylines from at least one of the set of BEV features or the set of PV features associated with the set of images and (2) the set of 3D objects in the set of BEV features using at least one CNN.

In another example, as shown at 1102, the UE may extract the set of PV features from the set of images prior to the detection, and convert the set of PV features to the set of BEV features, such as described in connection with FIG. 9.

For example, at 904, the UE 902 may obtain a set of images from at least one camera (which may also be referred to as image inputs). At 906, the UE 902 may be configured to extract a set of features from the set of images, such as by using a feature extractor module (which may be a NN/ML model). For example, as shown at 908, the set of features may be a set of PV features related to the driving and roads, such as vehicles, traffics objects (e.g., traffic lines, road signs, traffic lights, traffic equipments, etc.), pedestrians, animals, and/or anything that may typically be presented on roads, etc. At 910, the UE 902 may convert the set of features (e.g., the set of PV features) to a set of BEV features. The extraction of the set of PV features and/or the conversion of the set of PV features to the set of BEV features may be performed by, e.g., the object detection component 198, the camera 1232, the transceiver(s) 1222, the cellular baseband processor(s) 1224, and/or the application processor(s) 1206 of the apparatus 1204 in FIG. 12.

At 1106, the UE may associate the set of polylines with the set of 3D objects, such as described in connection with FIG. 9. For example, as discussed in connection with 918, the UE 902 may construct a graph (e.g., performing a graph construction) based on the outputs from the polyline detection module and the 3DOD module. The association of the set of polylines with the set of 3D objects may be performed by, e.g., the object detection component 198, the camera 1232, the transceiver(s) 1222, the cellular baseband processor(s) 1224, and/or the application processor(s) 1206 of the apparatus 1204 in FIG. 12.

In one example, to associate the set of polylines with the set of 3D objects, the UE may construct at least one graph representing the set of polylines and the set of 3D objects by creating a plurality of nodes and a plurality of edges to represent the set of polylines and the set of 3D objects. In some implementations, each node in the plurality of nodes may include property information of a polyline in the set of polylines or a 3D object in the set of 3D objects. In some implementations, the property information may include at least one of: a location, a size, or an orientation of the polyline or the 3D object. In some implementations, to construct the at least one graph representing the set of polylines and the set of 3D objects by creating the plurality of nodes and the plurality of edges to represent the set of polylines and the set of 3D objects, the UE may compute a set of distances between feature vectors of the plurality of nodes representing the set of polylines and the set of 3D objects, and construct the plurality of edges based on the computed set of distances, where each edge in the plurality of edges may connect to at least two nodes in the plurality of nodes. In some implementations, the UE may aggregate the constructed at least one graph with other sets of graphs created from other sets of images at different times to capture a long-term dependency between the set of polylines and the set of 3D objects. In some implementations, to aggregate the constructed at least one graph with the other sets of graphs created from the other sets of images at the different times, the UE may aggregate the constructed at least one graph with the other sets of graphs created from the other sets of images at the different times using at least one of an LSTM mechanism or an attention mechanism.

At 1108, the UE may update the set of polylines based on a set of nearby 3D objects or update the set of 3D objects based on a set of nearby polylines. For example, as discussed in connection with 920, the UE 902 may be configured to apply or to use a GNN with an attention mechanism to update the polylines (e.g., the polyline detections) based on nearby 3D object detections (or based on 3D objects within a distance threshold). Similarly, the UE 902 or the GNN may also update the 3D object detections based on the nearby polyline detections using the same or similar attention mechanism, with the learnable parameters being specific to updating the 3D object detections instead of the polylines. The update of the set of polylines and/or the set of 3D objects may be performed by, e.g., the object detection component 198, the camera 1232, the transceiver(s) 1222, the cellular baseband processor(s) 1224, and/or the application processor(s) 1206 of the apparatus 1204 in FIG. 12.

In one example, to update the set of polylines based on the set of nearby 3D objects, the UE may update the set of polylines based on the set of nearby 3D objects using a graph neural network (GNN) with an attention mechanism.

In another example, to update the set of 3D objects based on a set of nearby polylines, the UE may update the set of 3D objects based on the set of nearby polylines using a GNN with the attention mechanism.

At 1110, the UE may outputting an indication of the updated set of polylines or the updated set of 3D objects, such as described in connection with FIG. 9. For example, after applying the attention mechanism and/or the temporal aggregation, the UE 902 may output the resulted/updated polyline detections and/or 3D objects detections, such as to a navigation application or an autonomous driving application, etc. The output of the indication may be performed by, e.g., the object detection component 198, the camera 1232, the transceiver(s) 1222, the cellular baseband processor(s) 1224, and/or the application processor(s) 1206 of the apparatus 1204 in FIG. 12.

In one example, to output the indication of the updated set of polylines or the updated set of 3D objects, the UE may output, to a navigation application or an autonomous driving application, the indication of the updated set of polylines or the updated set of 3D objects.

In another example, to output the indication of the updated set of polylines or the updated set of 3D objects, the UE may store, in a memory or a cache, the indication of the updated set of polylines or the updated set of 3D objects.

Figure 12:
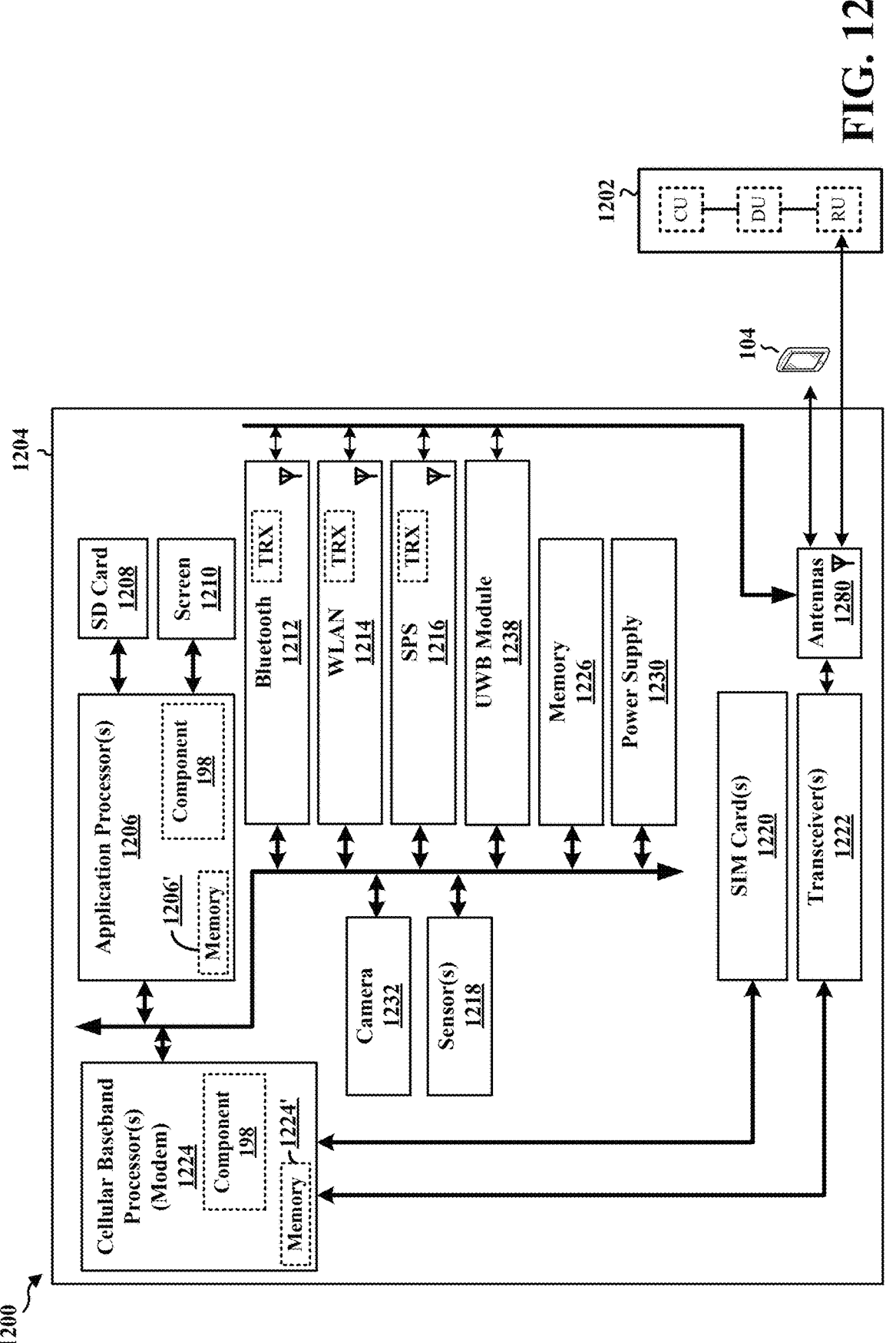
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include at least one cellular baseband processor 1224 (also referred to as a modem) coupled to one or more transceivers 1222 (e.g., cellular RF transceiver). The cellular baseband processor(s) 1224 may include at least one on-chip memory 1224'. In some aspects, the apparatus 1204 may further include one or more subscriber identity modules (SIM) cards 1220 and at least one application processor 1206 coupled to a secure digital (SD) card 1208 and a screen 1210. The application processor(s) 1206 may include on-chip memory 1206'. In some aspects, the apparatus 1204 may further include a Bluetooth module 1212, a WLAN module 1214, an ultrawide band (UWB) module 1238, an SPS module 1216 (e.g., GNSS module), one or more sensors 1218 (e.g., barometric pressure sensor/altimeter, motion sensor such as inertial measurement unit (IMU), gyroscope, and/or accelerometer(s); light detection and ranging (LI-DAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the UWB module 1238, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor(s) 1224 communicates through the transceiver(s) 1222 via one or more antennas 1280 with the UE 104 and/or with an RU associated with a network entity 1202. The cellular baseband processor(s) 1224 and the application processor(s) 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor(s) 1224 and the application processor(s) 1206 are each responsible for general processing, including the execution of software stored on the computer-readable medium/memory. The software, when executed by the cellular baseband processor(s) 1224/application processor(s) 1206, causes the cellular baseband processor(s) 1224/application processor(s) 1206 to perform the various functions described supra. The cellular baseband processor(s) 1224 and the application processor(s) 1206 are configured to perform the various functions described supra based at least in part of the information stored in the memory. That is, the cellular baseband processor(s) 1224 and the application processor(s) 1206 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1224/application processor(s) 1206 when executing software. The cellular baseband processor(s) 1224/application processor(s) 1206 may be a component of the UE 350 and may include the at least one memory 360 and/or at least one of the TX processor 368, the RX processor 356, and the controller/processor 359. In one configuration, the apparatus 1204 may be at least one processor chip (modem and/or application) and include just the cellular baseband processor(s) 1224 and/or the application processor(s) 1206, and in another configuration, the apparatus 1204 may be the entire UE (e.g., see UE 350 of FIG. 3) and include the additional modules of the apparatus 1204.

As discussed supra, the object detection component 198 may be configured to detect (1) a set of polylines from at least one of a set of BEV features or a set of PV features associated with a set of images and (2) a set of 3D objects in the set of BEV features. The object detection component 198 may also be configured to associate the set of polylines with the set of 3D objects. The object detection component 198 may also be configured to update the set of polylines based on a set of nearby 3D objects or update the set of 3D objects based on a set of nearby polylines. The object detection component 198 may also be configured to output an indication of the updated set of polylines or the updated set of 3D objects. The object detection component 198 may be within the cellular baseband processor(s) 1224, the application processor(s) 1206, or both the cellular baseband processor(s) 1224 and the application processor(s) 1206. The object detection component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1204 may include a variety of components configured for various functions. In one configuration, the apparatus 1204, and in particular the cellular baseband processor(s) 1224 and/or the application processor(s) 1206, may include means for detecting (1) a set of polylines from at least one of a set of BEV features or a set of PV features associated with a set of images and (2) a set of 3D objects in the set of BEV features. The apparatus 1204 may further include means for associating the set of polylines with the set of 3D objects. The apparatus 1204 may further include means for updating the set of polylines based on a set of nearby 3D objects or updating the set of 3D objects based on a set of nearby polylines. The apparatus 1204 may further include means for outputting an indication of the updated set of polylines or the updated set of 3D objects.

In one configuration, the means for detecting the set of polylines from the set of BEV features may include configuring the apparatus 1204 to detect a set of lane boundaries from the set of BEV features using a map decoder, and obtain the set of polylines based on the detected set of lane boundaries.

In another configuration, the means for detecting (1) the set of polylines from at least one of the set of BEV features or the set of PV features associated with the set of images and (2) the set of 3D objects in the set of BEV features may include configuring the apparatus 1204 to detect the set of polylines from at least one of the set of BEV features or the set of PV features associated with the set of images and (2) the set of 3D objects in the set of BEV features using at least one convolutional neural network (CNN).

In another configuration, the apparatus 1204 may further include means for extracting the set of PV features from the set of images prior to the detection, and means for converting the set of PV features to the set of BEV features.

In another configuration, the means for associating the set of polylines with the set of 3D objects may include configuring the apparatus 1204 to construct at least one graph representing the set of polylines and the set of 3D objects by creating a plurality of nodes and a plurality of edges to represent the set of polylines and the set of 3D objects. In some implementations, each node in the plurality of nodes may include property information of a polyline in the set of polylines or a 3D object in the set of 3D objects. In some implementations, the property information may include at least one of: a location, a size, or an orientation of the polyline or the 3D object. In some implementations, to construct the at least one graph representing the set of polylines and the set of 3D objects by creating the plurality of nodes and the plurality of edges to represent the set of polylines and the set of 3D objects may include configuring the apparatus 1204 to compute a set of distances between feature vectors of the plurality of nodes representing the set of polylines and the set of 3D objects, and construct the plurality of edges based on the computed set of distances, where each edge in the plurality of edges may connect to at least two nodes in the plurality of nodes. In some implementations, the apparatus 1204 may further include means for aggregating the constructed at least one graph with other sets of graphs created from other sets of images at different times to capture a long-term dependency between the set of polylines and the set of 3D objects. In some implementations, the means for aggregating the constructed at least one graph with the other sets of graphs created from the other sets of images at the different times may include configuring the apparatus 1204 to aggregate the constructed at least one graph with the other sets of graphs created from the other sets of images at the different times using at least one of an LSTM mechanism or an attention mechanism.

In another configuration, to means for updating the set of polylines based on the set of nearby 3D objects may include configuring the apparatus 1204 to update the set of polylines based on the set of nearby 3D objects using a GNN with an attention mechanism.

In another configuration, the means for updating the set of 3D objects based on a set of nearby polylines may include configuring the apparatus 1204 to update the set of 3D objects based on the set of nearby polylines using a GNN with the attention mechanism.

In another configuration, the means for outputting the indication of the updated set of polylines or the updated set of 3D objects may include configuring the apparatus 1204 to output, to a navigation application or an autonomous driving application, the indication of the updated set of polylines or the updated set of 3D objects.

In another configuration, the means for outputting the indication of the updated set of polylines or the updated set of 3D objects may include configuring the apparatus 1204 to store, in a memory or a cache, the indication of the updated set of polylines or the updated set of 3D objects.

The means may be the object detection component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C.

Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of image processing, comprising: detecting (1) a set of polylines from at least one of a set of bird's eye view (BEV) features or a set of perspective view (PV) features associated with a set of images and (2) a set of three-dimensional (3D) objects in the set of BEV features; associating the set of polylines with the set of 3D objects; updating the set of polylines based on a set of nearby 3D objects or updating the set of 3D objects based on a set of nearby polylines; and outputting an indication of the updated set of polylines or the updated set of 3D objects.

Aspect 2 is the method of aspect 1, further comprising: extracting the set of PV features from the set of images prior to the detection; and converting the set of PV features to the set of BEV features.

Aspect 3 is the method of aspect 1 or aspect 2, wherein detecting the set of polylines from the set of BEV features comprises: detecting a set of lane boundaries from the set of BEV features using a map decoder, and obtaining the set of polylines based on the detected set of lane boundaries.

Aspect 4 is the method of any of aspects 1 to 3, wherein detecting (1) the set of polylines from at least one of the set of BEV features or the set of PV features associated with the set of images and (2) the set of 3D objects in the set of BEV features comprises: detecting (1) the set of polylines from at least one of the set of BEV features or the set of PV features associated with the set of images and (2) the set of 3D objects in the set of BEV features using at least one convolutional neural network (CNN).

Aspect 5 is the method of any of aspects 1 to 4, wherein associating the set of polylines with the set of 3D objects comprises: constructing at least one graph representing the set of polylines and the set of 3D objects by creating a plurality of nodes and a plurality of edges to represent the set of polylines and the set of 3D objects.

Aspect 6 is the method of any of aspects 1 to 5, wherein each node in the plurality of nodes includes property information of a polyline in the set of polylines or a 3D object in the set of 3D objects.

Aspect 7 is the method of any of aspects 1 to 6, wherein the property information includes at least one of: a location, a size, or an orientation of the polyline or the 3D object.

Aspect 8 is the method of any of aspects 1 to 7, wherein constructing the at least one graph representing the set of polylines and the set of 3D objects by creating the plurality of nodes and the plurality of edges to represent the set of polylines and the set of 3D objects comprises: computing a set of distances between feature vectors of the plurality of nodes representing the set of polylines and the set of 3D objects; and constructing the plurality of edges based on the computed set of distances, wherein each edge in the plurality of edges connects to at least two nodes in the plurality of nodes.

Aspect 9 is the method of any of aspects 1 to 8, further comprising: aggregating the constructed at least one graph with other sets of graphs created from other sets of images at different times to capture a long-term dependency between the set of polylines and the set of 3D objects.

Aspect 10 is the method of any of aspects 1 to 9, wherein aggregating the constructed at least one graph with the other sets of graphs created from the other sets of images at the different times comprises: aggregating the constructed at least one graph with the other sets of graphs created from the other sets of images at the different times using at least one of a long short-term memory (LSTM) mechanism or an attention mechanism.

Aspect 11 is the method of any of aspects 1 to 10, wherein updating the set of polylines based on the set of nearby 3D objects comprises: updating the set of polylines based on the set of nearby 3D objects using a graph neural network (GNN) with an attention mechanism.

Aspect 12 is the method of any of aspects 1 to 11, wherein updating the set of 3D objects based on the set of nearby polylines comprises: updating the set of 3D objects based on the set of nearby polylines using a graph neural network (GNN) with the attention mechanism.

Aspect 13 is the method of any of aspects 1 to 12, wherein outputting the indication of the updated set of polylines or the updated set of 3D objects comprises: outputting, to a navigation application or an autonomous driving application, the indication of the updated set of polylines or the updated set of 3D objects.

Aspect 14 is the method of any of aspects 1 to 13, wherein outputting the indication of the updated set of polylines or the updated set of 3D objects comprises: storing, in a memory or a cache, the indication of the updated set of polylines or the updated set of 3D objects.

Aspect 15 is an apparatus for image processing, including: at least one memory; and at least one processor coupled to the at least one memory and, based at least in part on information stored in the at least one memory, the at least one processor, individually or in any combination, is configured to implement any of aspects 1 to 14.

Aspect 16 is the apparatus of aspect 15, further including at least one camera coupled to the at least one processor.

Aspect 17 is an apparatus for image processing including means for implementing any of aspects 1 to 14.

Aspect 18 is a computer-readable medium (e.g., a non-transitory computer-readable medium) storing computer executable code, where the code when executed by a processor causes the processor to implement any of aspects 1 to 14.

What is claimed is:

1. An apparatus for image processing, comprising:
at least one memory; and
at least one processor coupled to the at least one memory, the at least one processor, individually or in any combination, is configured to:
   detect (1) a set of polylines from at least one of a set of bird's eye view (BEV) features or a set of perspective view (PV) features associated with a set of images and (2) a set of three-dimensional (3D) objects in the set of BEV features;
   associate the set of polylines with the set of 3D objects;
   construct at least one graph representing the set of polylines and the set of 3D objects by creating a plurality of nodes and a plurality of edges to represent the set of polylines and the set of 3D objects;
   aggregate the constructed at least one graph with other sets of graphs created from other sets of images at different times to capture a long-term dependency between the set of polylines and the set of 3D objects;
   update the set of polylines based on a set of nearby 3D objects or update the set of 3D objects based on a set of nearby polylines; and
   output an indication of the updated set of polylines or the updated set of 3D objects.

2. The apparatus of claim 1, wherein the at least one processor, individually or in any combination, is further configured to:
   extract the set of PV features from the set of images prior to the detection; and
   convert the set of PV features to the set of BEV features.

3. The apparatus of claim 1, wherein to detect the set of polylines from the set of BEV features, the at least one processor, individually or in any combination, is configured to:
   detect a set of lane boundaries from the set of BEV features using a map decoder; and
   obtain the set of polylines based on the detected set of lane boundaries.

4. The apparatus of claim 1, wherein to detect (1) the set of polylines from at least one of the set of BEV features or the set of PV features associated with the set of images and (2) the set of 3D objects in the set of BEV features, the at least one processor, individually or in any combination, is configured to:

detect (1) the set of polylines from at least one of the set of BEV features or the set of PV features associated with the set of images and (2) the set of 3D objects in the set of BEV features using at least one convolutional neural network (CNN).

5. The apparatus of claim 1, wherein each node in the plurality of nodes includes property information of a polyline in the set of polylines or a 3D object in the set of 3D objects.

6. The apparatus of claim 5, wherein the property information includes at least one of: a location, a size, or an orientation of the polyline or the 3D object.

7. The apparatus of claim 1, wherein to construct the at least one graph representing the set of polylines and the set of 3D objects by creating the plurality of nodes and the plurality of edges to represent the set of polylines and the set of 3D objects, the at least one processor, individually or in any combination, is configured to:

compute a set of distances between feature vectors of the plurality of nodes representing the set of polylines and the set of 3D objects; and construct the plurality of edges based on the computed set of distances, wherein each edge in the plurality of edges connects to at least two nodes in the plurality of nodes.

8. The apparatus of claim 1, wherein to aggregate the constructed at least one graph with the other sets of graphs created from the other sets of images at the different times, the at least one processor, individually or in any combination, is configured to:

aggregate the constructed at least one graph with the other sets of graphs created from the other sets of images at the different times using at least one of a long short-term memory (LSTM) mechanism or an attention mechanism.

9. The apparatus of claim 1, wherein to update the set of polylines based on the set of nearby 3D object, the at least one processor, individually or in any combination, is configured to:

update the set of polylines based on the set of nearby 3D objects using a graph neural network (GNN) with an attention mechanism.

10. The apparatus of claim 1, wherein to update the set of 3D objects based on the set of nearby polylines, the at least one processor, individually or in any combination, is configured to:

update the set of 3D objects based on the set of nearby polylines using a graph neural network (GNN) with an attention mechanism.

11. The apparatus of claim 1, wherein to output the indication of the updated set of polylines or the updated set of 3D objects, the at least one processor, individually or in any combination, is configured to:

output, to a navigation application or an autonomous driving application, the indication of the updated set of polylines or the updated set of 3D objects.

12. The apparatus of claim 1, wherein to output the indication of the updated set of polylines or the updated set of 3D object, the at least one processor, individually or in any combination, is configured to:

store, in a memory or a cache, the indication of the updated set of polylines or the updated set of 3D objects.

13. A method of image processing, comprising:

detecting (1) a set of polylines from at least one of a set of bird's eye view (BEV) features or a set of perspective view (PV) features associated with a set of images and (2) a set of three-dimensional (3D) objects in the set of BEV features;

associating the set of polylines with the set of 3D objects;

constructing at least one graph representing the set of polylines and the set of 3D objects by creating a plurality of nodes and a plurality of edges to represent the set of polylines and the set of 3D objects;

aggregating the constructed at least one graph with other sets of graphs created from other sets of images at different times to capture a long-term dependency between the set of polylines and the set of 3D objects;

updating the set of polylines based on a set of nearby 3D objects or updating the set of 3D objects based on a set of nearby polylines; and outputting an indication of the updated set of polylines or the updated set of 3D objects.

14. The method of claim 13, further comprising:

extracting the set of PV features from the set of images prior to the detection; and converting the set of PV features to the set of BEV features.

15. The method of claim 13, wherein detecting the set of polylines from the set of BEV features comprises:

detecting a set of lane boundaries from the set of BEV features using a map decoder; and obtaining the set of polylines based on the detected set of lane boundaries.

16. The method of claim 13, wherein detecting (1) the set of polylines from at least one of the set of BEV features or the set of PV features associated with the set of images and (2) the set of 3D objects in the set of BEV features comprises:

detecting (1) the set of polylines from at least one of the set of BEV features or the set of PV features associated with the set of images and (2) the set of 3D objects in the set of BEV features using at least one convolutional neural network (CNN).

17. The method of claim 13, wherein each node in the plurality of nodes includes property information of a polyline in the set of polylines or a 3D object in the set of 3D objects.

18. The method of claim 17, wherein the property information includes at least one of: a location, a size, or an orientation of the polyline or the 3D object.

19. The method of claim 13, wherein constructing the at least one graph representing the set of polylines and the set of 3D objects by creating the plurality of nodes and the plurality of edges to represent the set of polylines and the set of 3D objects comprises:

computing a set of distances between feature vectors of the plurality of nodes representing the set of polylines and the set of 3D objects; and constructing the plurality of edges based on the computed set of distances, wherein each edge in the plurality of edges connects to at least two nodes in the plurality of nodes.

20. The method of claim 13, wherein aggregating the constructed at least one graph with the other sets of graphs created from the other sets of images at the different times comprises:

aggregating the constructed at least one graph with the other sets of graphs created from the other sets of images at the different times using at least one of a long short-term memory (LSTM) mechanism or an attention mechanism.

21. The method of claim 13, wherein updating the set of polylines based on the set of nearby 3D objects comprises:

updating the set of polylines based on the set of nearby 3D objects using a graph neural network (GNN) with an attention mechanism.

22. The method of claim 13, wherein updating the set of 3D objects based on the set of nearby polylines comprises:

updating the set of 3D objects based on the set of nearby polylines using a graph neural network (GNN) with an attention mechanism.

23. The method of claim 13, wherein outputting the indication of the updated set of polylines or the updated set of 3D objects comprises:

outputting, to a navigation application or an autonomous driving application, the indication of the updated set of polylines or the updated set of 3D objects.

24. The method of claim 13, wherein outputting the indication of the updated set of polylines or the updated set of 3D objects comprises:

storing, in a memory or a cache, the indication of the updated set of polylines or the updated set of 3D objects.

25. An apparatus for image processing, comprising:

means for detecting (1) a set of polylines from at least one of a set of bird's eye view (BEV) features or a set of perspective view (PV) features associated with a set of images and (2) a set of three-dimensional (3D) objects in the set of BEV features;

means for associating the set of polylines with the set of 3D objects;

means for constructing at least one graph representing the set of polylines and the set of 3D objects by creating a plurality of nodes and a plurality of edges to represent the set of polylines and the set of 3D objects;

means for aggregating the constructed at least one graph with other sets of graphs created from other sets of images at different times to capture a long-term dependency between the set of polylines and the set of 3D objects;

means for updating the set of polylines based on a set of nearby 3D objects or updating the set of 3D objects based on a set of nearby polylines; and means for outputting an indication of the updated set of polylines or the updated set of 3D objects.

26. A non-transitory computer-readable medium storing computer executable code, the code when executed by at least one processor causes the at least one processor to:

detect (1) a set of polylines from at least one of a set of bird's eye view (BEV) features or a set of perspective view (PV) features associated with a set of images and (2) a set of three-dimensional (3D) objects in the set of BEV features;

associate the set of polylines with the set of 3D objects;

construct at least one graph representing the set of polylines and the set of 3D objects by creating a plurality of nodes and a plurality of edges to represent the set of polylines and the set of 3D objects;

aggregate the constructed at least one graph with other sets of graphs created from other sets of images at different times to capture a long-term dependency between the set of polylines and the set of 3D objects;

update the set of polylines based on a set of nearby 3D objects or update the set of 3D objects based on a set of nearby polylines; and output an indication of the updated set of polylines or the updated set of 3D objects.

* * * * *